US011685803B2

(12) United States Patent
Matmour et al.

(10) Patent No.: US 11,685,803 B2
(45) Date of Patent: Jun. 27, 2023

(54) RESIN-EXTENDED ELASTOMER

(71) Applicant: COMPAGNIE GENERALE DES ETABLISSEMENTS MICHELIN, Clermont-Ferrand (FR)

(72) Inventors: Rachid Matmour, Clermont-Ferrand (FR); Richard Vivier, Clermont-Ferrand (FR); Vincent Abad, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 488 days.

(21) Appl. No.: 16/634,596

(22) PCT Filed: Jul. 26, 2018

(86) PCT No.: PCT/FR2018/051917
§ 371 (c)(1),
(2) Date: Jan. 28, 2020

(87) PCT Pub. No.: WO2019/020948
PCT Pub. Date: Jan. 31, 2019

(65) Prior Publication Data
US 2020/0157269 A1 May 21, 2020

(30) Foreign Application Priority Data

Jul. 28, 2017 (FR) .................... 1757187

(51) Int. Cl.
*C08F 279/02* (2006.01)
*C08C 19/25* (2006.01)
*B60C 1/00* (2006.01)

(52) U.S. Cl.
CPC .......... *C08F 279/02* (2013.01); *B60C 1/0016* (2013.01); *C08C 19/25* (2013.01)

(58) Field of Classification Search
CPC .......... C08C 19/25; B60C 1/00; C08F 279/02
USPC ....................................... 524/575
See application file for complete search history.

(56) References Cited

U.S. PATENT DOCUMENTS

| | | |
|---|---|---|
| 5,977,238 A | 11/1999 | Labauze |
| 6,013,718 A | 1/2000 | Cabioch et al. |
| 6,503,973 B2 | 1/2003 | Robert et al. |
| 6,815,473 B2 | 11/2004 | Robert et al. |
| 6,838,534 B2 | 1/2005 | Laubry |
| 7,056,998 B2 | 6/2006 | Laubry et al. |
| 7,094,854 B2 | 8/2006 | Monteil et al. |
| 7,199,175 B2 | 4/2007 | Vasseur |
| 7,250,463 B2 | 7/2007 | Durel et al. |
| 7,312,264 B2 | 12/2007 | Gandon-Pain |
| 7,547,654 B2 | 6/2009 | Boisson et al. |
| 7,820,771 B2 | 10/2010 | Lapra et al. |
| 7,900,667 B2 | 3/2011 | Vasseur |
| 8,039,565 B2 | 10/2011 | Boisson et al. |
| 8,071,800 B2 | 12/2011 | Thuilliez et al. |
| 8,268,949 B2 | 9/2012 | Thuilliez et al. |
| 8,299,184 B2 | 10/2012 | Kurazumi et al. |
| 8,344,063 B2 | 1/2013 | Marechal et al. |
| 8,394,903 B2 | 3/2013 | Marechal |
| 8,455,584 B2 | 6/2013 | Robert et al. |
| 8,461,269 B2 | 6/2013 | Varagniat et al. |
| 8,492,479 B2 | 7/2013 | Robert et al. |
| 8,883,929 B2 | 11/2014 | Gandon-Pain et al. |
| 9,056,303 B2 | 6/2015 | Parola et al. |
| 9,175,124 B2 | 11/2015 | Chaboche et al. |
| 9,333,803 B2 | 5/2016 | Izuchi |
| 9,670,291 B2 | 6/2017 | Marechal et al. |
| 9,822,247 B2 | 11/2017 | Abad |
| 9,944,775 B2 | 4/2018 | Voge et al. |
| 10,435,544 B2 | 10/2019 | Abad |
| 2001/0036991 A1 | 11/2001 | Robert et al. |
| 2002/0183436 A1 | 12/2002 | Robert et al. |
| 2003/0212185 A1 | 11/2003 | Vasseur |
| 2004/0009870 A1 | 1/2004 | Laubry |
| 2005/0004297 A1 | 1/2005 | Durel et al. |
| 2005/0032965 A1 | 2/2005 | Valero |
| 2005/0130835 A1 | 6/2005 | Laubry et al. |
| 2005/0239639 A1 | 10/2005 | Monteil et al. |
| 2006/0089445 A1 | 4/2006 | Gandon-Pain |
| 2006/0160969 A1 | 7/2006 | Boisson et al. |
| 2007/0112120 A1 | 5/2007 | Vasseur |
| 2008/0132644 A1 | 6/2008 | Lapra et al. |
| 2009/0182106 A1 | 7/2009 | Parola et al. |
| 2009/0203828 A1 | 8/2009 | Kurazumi et al. |
| 2009/0270558 A1 | 10/2009 | Gandon-pain et al. |
| 2009/0270578 A1 | 10/2009 | Boisson et al. |
| 2010/0022714 A1 | 1/2010 | Varagniat et al. |
| 2010/0022725 A1 | 1/2010 | Thuilliez et al. |
| 2010/0184912 A1 | 7/2010 | Marechal et al. |
| 2010/0221541 A1 | 9/2010 | Valero et al. |
| 2010/0249270 A1 | 9/2010 | Robert et al. |
| 2010/0252156 A1 | 10/2010 | Robert et al. |

(Continued)

FOREIGN PATENT DOCUMENTS

| | | |
|---|---|---|
| EP | 1127909 A1 | 8/2001 |
| EP | 2 423 252 A1 | 2/2012 |

(Continued)

OTHER PUBLICATIONS

International Search Report dated Oct. 23, 2018, in corresponding PCT/FR2018/051917 (4 pages).

(Continued)

*Primary Examiner* — Deve V Hall
(74) *Attorney, Agent, or Firm* — Venable LLP

(57) ABSTRACT

A resin-extended elastomer comprises an elastomer which is a synthetic diene elastomer with a number-average molar mass of greater than or equal to 200,000 g/mol and a resin which is a plasticizing hydrocarbon-based resin. A process for obtaining such a resin-extended elastomer and compositions, semi-finished products for tires and tires containing same are also disclosed.

16 Claims, No Drawings

(56) References Cited

U.S. PATENT DOCUMENTS

| | | |
|---|---|---|
| 2011/0021702 A1 | 1/2011 | Gandon-Pain et al. |
| 2011/0178233 A1 | 7/2011 | Chaboche et al. |
| 2011/0251354 A1 | 10/2011 | Marechal |
| 2011/0263784 A1 | 10/2011 | Valero et al. |
| 2012/0031537 A1 | 2/2012 | Izuchi |
| 2012/0165492 A1 | 6/2012 | Thuilliez et al. |
| 2012/0208948 A1 | 8/2012 | Gandon-Pain et al. |
| 2012/0252928 A1 | 10/2012 | Marechal et al. |
| 2013/0172474 A1 | 7/2013 | Voge et al. |
| 2013/0196085 A1* | 8/2013 | Voge ................. C08L 7/00 428/12 |

FOREIGN PATENT DOCUMENTS

| | | |
|---|---|---|
| FR | 2740778 A1 | 5/1997 |
| FR | 2765882 A1 | 1/1999 |
| JP | 2012-52028 A | 3/2012 |
| JP | 2013-518159 A | 5/2013 |
| WO | 97/36724 A2 | 10/1997 |
| WO | 99/16600 A1 | 4/1999 |
| WO | 01/92402 A1 | 12/2001 |
| WO | 02/10269 A2 | 2/2002 |
| WO | 02/38636 A1 | 5/2002 |
| WO | 03/016215 A1 | 2/2003 |
| WO | 03/016387 A1 | 2/2003 |
| WO | 03/097708 A1 | 11/2003 |
| WO | 2004/035639 A1 | 4/2004 |
| WO | 2004/096865 A2 | 11/2004 |
| WO | 2005/028526 A1 | 3/2005 |
| WO | 2006/069792 A1 | 7/2006 |
| WO | 2006/069793 A1 | 7/2006 |
| WO | 2007/045417 A1 | 4/2007 |
| WO | 2007/054224 A1 | 5/2007 |
| WO | 2008/003434 A1 | 1/2008 |
| WO | 2008/003435 A1 | 1/2008 |
| WO | 2008/141702 A1 | 11/2008 |
| WO | 2009/000750 A1 | 12/2008 |
| WO | 2009/000752 A1 | 12/2008 |
| WO | 2007/094370 A1 | 7/2009 |
| WO | 2009/133068 A1 | 11/2009 |
| WO | 2010/072761 A1 | 7/2010 |
| WO | 2011/042507 A1 | 4/2011 |
| WO | 2010/123015 A1 | 10/2012 |
| WO | 2017/165499 A1 | 9/2017 |
| WO | WO-2017165499 A1 * | 9/2017 ............ C08F 136/06 |

OTHER PUBLICATIONS

S. Brunauer, et al., "Adsorption of Gases in Multimolecular Layers", J. Am. Chem. Soc., vol. 60, pp. 309-319 (1938).

R. Mildenberg, et al., "Rubber Tires and Mechanical Goods", Hydrocarbon Resins, VCH, New York, chapter 5.5, pp. 141-146 (1997).

* cited by examiner

RESIN-EXTENDED ELASTOMER

BACKGROUND

The present invention relates to a resin-extended elastomer, to the process for obtaining same and to rubber compositions containing same. These rubber compositions may notably be used for manufacturing tyres.

Since fuel savings and the need to protect the environment have become a priority, it is desirable to produce tyres having reduced rolling resistance, without adversely affecting other properties such as high dry and wet road grip.

One way of achieving this compromise of properties, in particular from the point of view of the rolling resistance and the wet and dry road grip, consists in using a high content of plasticizers, notably a high content of plasticizing resins, in low-hysteresis rubber compositions having the characteristic of being reinforced with inorganic reinforcing fillers, such as highly dispersible silicas (HDS), which are capable of competing, from the reinforcing viewpoint, with conventional tyre-grade carbon blacks.

These compositions are usually prepared by incorporating all of their constituents into mixers.

However, the incorporation of a high content of plasticizing resins during the manufacture of these compositions poses problems.

Specifically, this incorporation of a high content of plasticizing resins into a rubber composition has the consequence of increasing the tackiness of the composition. This increase is so great that the rubber composition sticks to the rotors of the mixer or to the various other metallic components of the mixing line, preventing the mixer from functioning correctly. This may thus result in a loss of material, i.e. only a part of the material introduced into the mixer emerges at its extremity. Furthermore, it is very often necessary to stop the mixer in order to remove the composition stuck to the metallic parts. Stoppage of the mixer for manual cleaning thereof is very penalizing for the manufacturers since it causes the productivity to drop. Compositions with a high content of plasticizing resins are thus processable differently in the usual tools for manufacturing rubber compositions, such as internal mixers.

The technical problem that the invention proposes to solve is that of improving the processability of rubber compositions with a high content of resins.

This aim is achieved since the Applicant has just discovered, surprisingly, in the course of its research, that the use of a specific compound reduces the tackiness of compositions containing it. This specific compound improves the processability of such rubber compositions.

SUMMARY

Thus, one subject of the invention is a resin-extended elastomer, the elastomer of which is a synthetic diene elastomer with a number-average molar mass of greater than or equal to 200 000 g/mol and the resin of which is a plasticizing hydrocarbon-based resin.

According to a preferred embodiment, the number-average molar mass of the synthetic diene elastomer is less than or equal to 500 000 g/mol.

According to a preferred embodiment, the number-average molar mass of the synthetic diene elastomer is in a range extending from 250 000 g/mol to 450 000 g/mol.

According to a preferred embodiment, the synthetic diene elastomer comprises at least one conjugated diene monomer containing from 4 to 12 carbon atoms.

According to a preferred embodiment, the conjugated diene monomer containing 4 to 12 carbon atoms is chosen from the group constituted by 1,3-butadiene, 2-methyl-1,3-butadiene, 2,3-di($C_1$-$C_5$ alkyl)-1,3-butadienes, 1,3-pentadiene, 2,4-hexadiene and mixtures of these monomers.

According to a preferred embodiment, the conjugated diene monomer containing 4 to 12 carbon atoms is chosen from the group constituted by 1,3-butadiene, 2-methyl-1,3-butadiene, and mixtures of these monomers.

According to a preferred embodiment, the synthetic diene elastomer also comprises at least one vinylaromatic monomer containing from 8 to 20 carbon atoms.

According to a preferred embodiment, the vinylaromatic monomer containing from 8 to 20 carbon atoms is chosen from the group constituted by styrene, ortho-methylstyrene, meta-methylstyrene, para-methylstyrene, the "vinyl-toluene" commercial mixture, para-tert-butyl styrene, methoxystyrenes, chlorostyrenes, vinylmesitylene, divinylbenzene, vinylnaphthalene, and mixtures of these monomers.

According to a preferred embodiment, the vinylaromatic monomer containing from 8 to 20 carbon atoms is styrene and the conjugated diene monomer containing 4 to 12 carbon atoms is 1,3-butadiene.

According to a preferred embodiment, the synthetic diene elastomer is functionalized with a function chosen from the group constituted by functional groups including a carbon-tin bond, amino functional groups, functional groups including a silanol, functional groups including an alkoxysilane, carboxylic groups, polyether groups, epoxide groups and mixtures thereof.

According to a preferred embodiment, the synthetic diene elastomer is obtained by solution polymerization, preferably by homogeneous solution polymerization.

According to a preferred embodiment, the plasticizing hydrocarbon-based resin has a number-average molar mass of between 400 and 2000 g/mol, preferably between 500 and 1500 g/mol.

According to a preferred embodiment, the plasticizing hydrocarbon-based resin is chosen from the group constituted by aliphatic resins, aromatic resins and mixtures of these resins.

According to a preferred embodiment, the plasticizing hydrocarbon-based resin is chosen from the group constituted by cyclopentadiene homopolymer or copolymer resins, dicyclopentadiene homopolymer or copolymer resins, terpene homopolymer or copolymer resins, C5 fraction homopolymer or copolymer resins, C9 fraction homopolymer or copolymer resins, mixtures of C5 fraction homopolymer or copolymer resins and of C9 fraction homopolymer or copolymer resins, α-methylstyrene homopolymer or copolymer resins, and mixtures of these resins.

According to a preferred embodiment, the content of plasticizing hydrocarbon-based resin is in a range extending from 5 to 100 phr, preferably from 30 to 80 phr.

According to a preferred embodiment, the resin-extended elastomer is obtained by mixing the synthetic diene elastomer in solution in an organic solvent and the plasticizing hydrocarbon-based resin in the liquid state.

Another subject of the present invention is a process for obtaining a resin-extended elastomer, the process comprising at least:
(a) one step of placing at least one synthetic diene elastomer in solution in an organic solvent in contact with at least one plasticizing hydrocarbon-based resin, said synthetic diene elastomer having a number-average molar mass of greater than or equal to 200 000 g/mol, (b) one mixing step to obtain a homogeneous solution of synthetic diene elastomer and of plasticizing hydrocarbon-based resin, (c) one steam stripping step to recover a gaseous fraction enriched in organic solvent and an aqueous dispersion of particles of synthetic diene elastomer and of plasticizing hydrocarbon-based resin; and (d) one step of recovering the resin-extended elastomer from the aqueous dispersion of particles of synthetic diene elastomer and of plasticizing hydrocarbon-based resin.

According to a preferred embodiment, the production process also comprising, between step (c) of removing the organic solvent and the drying step (d), at least one step (c') of washing the aqueous dispersion of particles of synthetic diene elastomer and of plasticizing hydrocarbon-based resin.

According to a preferred embodiment, the gaseous fraction enriched in organic solvent is recycled into step (a).

According to a preferred embodiment, the synthetic diene elastomer of step (a) is obtained either by dissolution of said elastomer in the organic solvent or by solution polymerization in the organic solvent of the corresponding monomers of said elastomer.

According to a preferred embodiment, during the placing in contact in step (a), the plasticizing hydrocarbon-based resin is in the liquid state.

According to a preferred embodiment, the plasticizing hydrocarbon-based resin in the liquid state is obtained by heating said resin to a temperature greater than or equal to its softening point.

According to a preferred embodiment, the plasticizing hydrocarbon-based resin in the liquid state is obtained by dissolving said resin in an organic solvent identical to or different from the organic solvent in which the synthetic diene elastomer is present.

According to a preferred embodiment, the number-average molar mass of the synthetic diene elastomer is less than or equal to 500 000 g/mol, and more preferentially is in a range extending from 250 000 g/mol to 450 000 g/mol.

According to a preferred embodiment, said synthetic diene elastomer has a glass transition temperature of less than or equal to −60° C., more preferentially in a range extending from −110° C. to −60° C., more preferentially extending from −95° C. to −65° C.

According to a preferred embodiment, the synthetic diene elastomer comprises at least one conjugated diene monomer containing from 4 to 12 carbon atoms.

According to a preferred embodiment, the synthetic diene elastomer also comprises at least one vinylaromatic monomer containing from 8 to 20 carbon atoms.

According to a preferred embodiment, the synthetic diene elastomer is functionalized with a function chosen from the group constituted by functional groups including a carbon-tin bond, amino functional groups, functional groups including a silanol, functional groups including an alkoxysilane, carboxylic groups, polyether groups, epoxide groups and mixtures thereof.

According to a preferred embodiment, the plasticizing hydrocarbon-based resin has a number-average molar mass of between 400 and 2000 g/mol, preferably between 500 and 1500 g/mol.

According to a preferred embodiment, the plasticizing hydrocarbon-based resin has a glass transition temperature of greater than or equal to 20° C., preferably greater than or equal to 30° C.

Another subject of the present invention relates to a resin-extended elastomer that may be obtained via the process defined above.

According to a preferred embodiment, the resin-extended elastomer has a Mooney viscosity index of greater than or equal to 40 MU, preferably in a range extending from 50 to 75 MU.

Surprisingly, despite the high number-average molar mass of the resin-extended elastomer, it has a good Mooney viscosity and may be used in rubber compositions.

Thus, another subject of the present invention relates to a composition based on at least one resin-extended elastomer as defined above or which may be obtained according to the process described above and on at least one reinforcing filler.

According to a preferred embodiment, the composition also comprising at least one chemical crosslinking system.

Rubber compositions containing a resin-extended elastomer in accordance with the invention have the advantage, despite the presence of a high content of plasticizing resin, of having lower tackiness on the mixing tools than compositions containing the same content of plasticising resin and an elastomer of the same microstructure, which is not resin-extended. The use of this resin-extended elastomer in rubber compositions allows a gain in productivity of the mixing line; the stoppages of the line for cleaning are more limited due to the better processability of the rubber composition containing such a compound.

Another subject of the present invention relates to a semi-finished product for tyres comprising at least one resin-extended elastomer as defined above or which may be obtained via the process described above.

Another subject of the present invention relates to a semi-finished product for a tyre, comprising at least one composition as defined above.

Another subject of the present invention relates to a tyre comprising at least one resin-extended elastomer as defined above or which may be obtained via the process described above.

Another subject of the present invention relates to a tyre comprising at least one composition as defined above.

1—MEASURING METHODS USED 1.1 Measurement of the Number-Average (Mn) and Weight-Average (Mw) Molar Masses and the Polydispersity Index for the Resin-Extended or Unextended Elastomers Size exclusion chromatography (SEC) is used. SEC makes it possible to separate macromolecules in solution according to their size through columns filled with a porous gel. The macromolecules are separated according to their hydrodynamic volume, the bulkiest being eluted first.

Without being an absolute method, SEC makes it possible to comprehend the molar mass distribution of an elastomer. The various number-average molar masses (Mn) and weight-average molar masses (Mw) may be determined from commercial standards and the polydispersity index (PI=Mw/Mn) may be calculated via a "Moore" calibration.

Preparation of the Elastomer Sample to be Tested:

There is no specific treatment for the elastomer sample before analysis. Said sample is simply dissolved to a concentration of about 1 g/l, in chloroform or in the following mixture: tetrahydrofuran+1 vol % of diisopropylamine+1 vol % of triethylamine+1 vol % of distilled water (vol %=% by volume). The solution is then filtered through a filter with a porosity of 0.45 μm before injection.

Sec Analysis:

The apparatus used is a Waters Alliance chromatograph. The elution solvent is the following mixture: tetrahydrofuran+1 vol % of diisopropylamine+1 vol % of triethylamine or chloroform according to the solvent used for dissolving the elastomer. The flow rate is 0.7 ml/min, the temperature of the system is 35° C. and the analysis time is 90 min. A set of four Waters columns in series, having the commercial names Styragel HMW7, Styragel HMW6E and two Styragel HT6E, is used.

The volume of the solution of the elastomer sample injected is 100 µl. The detector is a Waters 2410 differential refractometer at a wavelength of 810 nm. The software for processing the chromatographic data is the Waters Empower system.

The calculated average molar masses are relative to a calibration curve produced from PSS Ready Cal-Kit commercial polystyrene standards.

1.2 Measurement of the Number-Average (Mn) and Weight-Average (Mw) Molar Masses and the Polydispersity Index for the Plasticizing Hydrocarbon-Based Resins The macrostructure (Mw, Mn and PI) of the plasticizing resin is also determined by size exclusion chromatography (SEC) according to the following protocol.

Preparation of the Plasticizing Resin Sample to be Tested:

There is no specific treatment for the plasticizing resin sample before analysis. It is simply dissolved to a concentration of about 1 g/l, in tetrahydrofuran. The solution is then filtered through a filter with a porosity of 0.45 µm before injection.

Sec Analysis:

The apparatus used is a Waters Alliance 2695 chromatograph. The elution solvent is antioxidant-free tetrahydrofuran. The flow rate is 1 ml/min, the temperature of the system is 35° C. and the analysis time is 45 min.

A set of four Agilent columns in series, having the commercial names PL Gel Mixed D and PL Gel Mixed E, is used. This set is composed of two PL Gel Mixed D columns in series followed by two PL Gel Mixed E columns in series.

The volume of the solution of the plasticizing resin sample injected is 100 µl. The detector is a Waters 2410 differential refractometer at a wavelength of 810 nm. The software for processing the chromatographic data is the Waters Empower system.

The calculated average molar masses are relative to a calibration curve produced from commercial polystyrene standards from the company PSS Polymer, having the commercial name PSS Ready Cal-Kit PSS-pskitrl 1 and a 162 g/mol polystyrene standard from the company PSS Polymer having the commercial name PSS-ps162.

1.3 Measurement of the Glass Transition Temperature

The glass transition temperature, Tg, is measured using a differential scanning calorimeter. The analysis is performed according to the requirements of the standard ASTM D3418-08 (2008).

1.4 Determination of the Microstructure of the Elastomers by $^1$H NMR Spectroscopy The determinations of the contents of the various monomer units and of their microstructures within the elastomer are performed by NMR analysis. The spectra are acquired on a Bruker Avance 500 MHz spectrometer equipped with a 5 mm BBIz-grad "broad band" probe. The quantitative $^1$H NMR experiment uses a single 30° pulse sequence and a repetition time of 5 seconds between each acquisition. The samples are dissolved in $CDCl_3$ chloroform.

1.5 Determination of the Amount of Plasticizing Hydrocarbon-Based Resin in the Resin-Extended Elastomer The determination of the amount of plasticizing resin in the resin-extended elastomer is also performed by size exclusion chromatography (SEC) analysis.

Preparation of the Resin-Extended Elastomer Sample to be Tested:

There is no specific treatment for the resin-extended elastomer sample before analysis. It is simply dissolved to a concentration of about 1 g/l, in tetrahydrofuran with the antioxidant BHT at 250 ppm. The solution is then filtered through a filter with a porosity of 0.45 µm before injection.

Sec Analysis:

The apparatus used is a Waters Alliance 2695 chromatograph. The elution solvent is tetrahydrofuran with the antioxidant BHT at 250 ppm. The flow rate is 1 ml/min, the temperature of the system is 35° C. and the analysis time is 35 min.

A set of three Agilent columns in series, having the commercial names PL Gel Mixed-D and PL Gel Mixed-E, is used. This set is composed of two Agilent PL Gel Mixed D columns and one Agilent PL Gel Mixed E column in series.

The volume of the solution of the resin-extended elastomer sample injected is 100 µl. The detector is a Waters 2410 differential refractometer, at a wavelength of 810 nm, and the software for processing the chromatographic data is the Waters Empower system.

Calibrants using a non-resin-extended elastomer of the same microstructure as the resin-extended elastomer are used. These calibrants are prepared in tetrahydrofuran with the antioxidant BHT at 250 ppm (BHT butyl hydroxytoluene). Several calibrants are prepared using a non-resin-extended elastomer at precisely known concentrations in g/l so as to obtain a calibration range. Each calibrant is injected at 100 µl into the chromatographic system. With the aid of the data processing software, each calibrant peak is integrated. It is then possible to determine the total area of the peak of each calibrant. A calibration curve is then constructed by plotting the area of the peak of the calibrant as a function of the concentration.

The resin-extended elastomer is then injected following the production of the calibration curve. Since the signals for the resin and the elastomer are separated by means of the SEC columns, a quantification can thus be performed. The peak obtained for the elastomer is then integrated using the data processing software; the area for said peak is then reported on the previously constructed calibration curve. It is then possible to deduce the elastomer concentration in g/L in the oil-extended elastomer ($C_{elasto}$). The concentration of the dissolved resin-extended elastomer is known ($C_{samp}$). Quantification of the resin content is thus performed indirectly by the following relationship: Resin content= $1-C_{elasto}/C_{samp}$.

1.6 Determination of the Mooney Viscosity $ML_{(1+4)}$ at 100° C. According to the Standard ASTM D-1646 for the Elastomers A consistometer as described in the standard ASTM D-1646 is used. The Mooney viscosity measurement is performed according to the following principle: the elastomer is moulded in a cylindrical chamber heated to 100° C. After preheating for one minute, the rotor rotates within the test specimen at 2 rev·min$^{-1}$ and the working torque for maintaining this movement after rotating for 4 minutes is measured. The Mooney viscosity ($ML_{(1+4)}$) is expressed in "Mooney Units" (MU, with 1 MU=0.83 N·m).

1.7 Determination of the Tackiness of a Non-Vulcanized Rubber Composition

The tack of the rubber compositions is measured by means of a tack measurement, which is also referred to as an adhesion test, also known as a probe-tack test. The probe-tack test corresponds to a test of contact between a surface (a probe) and an adhesive (the composition). The test is performed at a temperature of 70° C. corresponding to the temperature of the rubber composition and of the surface; the composition not being vulcanized. The variation in the force applied as a function of the movement is recorded. The analysis is performed according to the requirements of the standard ASTM D2979-01 (2009).

The results are expressed in base 100. The value in base 100 for the sample to be tested is calculated according to the operation: (value of the maximum force in newtons to separate the probe from the adhesive/test sample/value of the maximum force in newtons to separate the probe from the adhesive/control)×100). In this way, a result of less than 100 indicates a decrease in tackiness, which corroborates better processability of the composition.

1.8 Measurement of the BET and CTAB Specific Surface Area of the Silica

The BET specific surface area of the silica is determined by gas adsorption using the Brunauer-Emmett-Teller method described in "The Journal of the American Chemical Society", (Vol. 60, page 309, February 1938), and more specifically according to a method derived from the standard NF ISO 5794-1, appendix E, of June 2010 [multipoint (5 point) volumetric method—gas: nitrogen—degassing under vacuum: one hour at 160° C.—relative pressure range p/po: 0.05 to 0.2].

The CTAB specific surface area ($S_{CTAB}$) values were determined according to the standard NF ISO 5794-1, appendix G of June 2010. The process is based on the adsorption of CTAB (N-hexadecyl-N,N,N-trimethylammonium bromide) to the "outer" surface of the silica.

2—DETAILED DESCRIPTION OF THE INVENTION

In the present description, unless expressly indicated otherwise, all the percentages (%) indicated are mass percentages.

Furthermore, any range of values denoted by the expression "between a and b" represents the range of values extending from more than "a" to less than "b" (that is to say, limits a and b excluded), while any range of values denoted by the expression "from a to b" means the range of values extending from "a" up to "b" (that is to say, including the strict limits a and b).

In the present patent application, the term "phr" means parts by weight of a constituent per hundred parts by weight of elastomer.

In the context of the invention, the carbon-based products mentioned in the description may be of fossil or biosourced origin. In the latter case, they may be partially or completely derived from biomass or may be obtained from renewable starting materials derived from biomass. Polymers, plasticizers, fillers and the like are notably concerned.

2.1—Resin-Extended Elastomer

One subject of the invention is a resin-extended elastomer, the elastomer of which is a synthetic diene elastomer with a number-average molar mass of greater than or equal to 200 000 g/mol and the resin of which is a plasticizing hydrocarbon-based resin.

For the purposes of the present invention, the term "resin-extended elastomer" refers to a material of solid composite type formed from an elastomer and a resin which are intimately mixed with each other.

Elastomer

A first constituent of the resin-extended elastomer in accordance with the invention is a synthetic diene elastomer with a number-average molar mass of greater than or equal to 200 000 g/mol.

A "diene" elastomer (or, equivalently, "rubber", the two terms being considered to be synonymous) should be understood, in a known manner, to mean an (one or more is understood) elastomer constituted at least partly (i.e., a homopolymer or a copolymer) from diene monomer units (monomers bearing two carbon-carbon double bonds which may or may not be conjugated).

Diene elastomers may be classified into two categories: "essentially unsaturated" or "essentially saturated". What is generally meant by the term "essentially unsaturated" is a diene elastomer resulting at least partly from conjugated diene monomers having a content of units of diene origin (conjugated dienes) which is greater than 15% (mol %); thus, diene elastomers such as butyl rubbers or copolymers of dienes and of α-olefins of EPDM type do not come under the above definition and can notably be termed "essentially saturated" diene elastomers (low or very low content of units of diene origin, always less than 15% (mol %)). In the category of "essentially unsaturated" diene elastomers, the term "highly unsaturated" diene elastomer refers in particular to a diene elastomer with a content of units of diene origin (conjugated dienes) which is greater than 50% (mol %).

For the purposes of the present invention, the term "synthetic elastomer" means an elastomer obtained by chemical synthesis from monomers that are biosourced or else derived from petroleum chemistry. A synthetic elastomer thus differs from natural rubber which is a natural diene elastomer.

Given these definitions, a "synthetic diene elastomer" that is able to be used in the resin-extended elastomer in accordance with the invention more particularly refers to:

(a) any homopolymer of a conjugated diene monomer, notably any homopolymer obtained by polymerization of a conjugated diene monomer containing from 4 to 12 carbon atoms;

(b) any copolymer obtained by copolymerization of one or more conjugated dienes with each other or with one or more vinylaromatic compounds containing from 8 to 20 carbon atoms;

(c) a ternary copolymer obtained by copolymerization of ethylene and of an α-olefin containing from 3 to 6 carbon atoms with a non-conjugated diene monomer containing from 6 to 12 carbon atoms, for instance the elastomers obtained from ethylene and propylene with a non-conjugated diene monomer of the abovementioned type, such as, in particular, 1,4-hexadiene, ethylidenenorbornene or dicyclopentadiene;

(d) a copolymer of isobutene and of isoprene (butyl rubber) and also the halogenated versions, in particular chlorinated or brominated versions, of this type of copolymer, (e) any copolymer obtained by copolymerization of one or more conjugated dienes with ethylene, an acyclic aliphatic α-monoolefin containing from 3 to 18 carbon atoms or a mixture thereof, for instance those described in WO 2005/028526, WO 2004/035639 and WO 2007/054224.

Although it applies to any type of synthetic diene elastomer, a person skilled in the art will understand that the present invention is preferably performed with essentially unsaturated diene elastomers, in particular of the above type (a) or (b).

Preferentially, the synthetic diene elastomer comprises at least one conjugated diene monomer containing from 4 to 12 carbon atoms.

It may thus be a homopolymer of conjugated diene monomers containing from 4 to 12 carbon atoms or a copolymer resulting from the polymerization of conjugated diene monomers containing from 4 to 12 carbon atoms with another polymerizable monomer.

Preferentially, the conjugated diene monomer containing 4 to 12 carbon atoms of the synthetic diene elastomer is chosen from the group constituted by 1,3-butadiene, 2-methyl-1,3-butadiene, 2,3-di(C1-C5 alkyl)-1,3-butadienes, for instance 2,3-dimethyl-1,3-butadiene, 2,3-diethyl-1,3-butadiene, 2-methyl-3-ethyl-1,3-butadiene, 2-methyl-3-isopropyl-1,3-butadiene, 1,3-pentadiene, 2,4-hexadiene, and mixtures of these monomers.

More preferentially, the conjugated diene monomer containing 4 to 12 carbon atoms is chosen from the group constituted by 1,3-butadiene, 2-methyl-1,3-butadiene, and mixtures of these monomers.

The other monomer that is polymerizable with the conjugated diene monomers containing from 4 to 12 carbon atoms (first monomer) may be:
- a conjugated diene monomer containing from 4 to 12 carbon atoms other than the first monomer;
- a vinylaromatic monomer containing from 8 to 20 carbon atoms;
- an α-olefin monomer, such as propylene, 1-butene, isobutylene, pentene, methylpentene or 1-hexene;
- ethylene; and
- a mixture of these monomers.

Preferentially, the other polymerizable monomer is a vinylaromatic monomer containing from 8 to 20 carbon atoms. Thus, the synthetic diene elastomer that may be used in the resin-extended elastomer in accordance with the invention also comprises at least one vinylaromatic monomer containing from 8 to 20 carbon atoms. In this case, it is a copolymer.

Vinylaromatic monomers containing from 8 to 20 carbon atoms that are notably suitable for use include styrene monomers, namely any monomer, unsubstituted or substituted, comprising styrene. Among the substituted styrenes, examples that may be mentioned include methylstyrenes (for example o-methylstyrene, m-methylstyrene or p-methylstyrene, α-methylstyrene, α-2-dimethylstyrene, α-4-dimethylstyrene or diphenylethylene), para-tert-butyl styrene, chlorostyrenes (for example o-chlorostyrene, m-chlorostyrene, p-chlorostyrene, 2,4-dichlorostyrene, 2,6-dichlorostyrene or 2,4,6-trichlorostyrene), bromostyrenes (for example o-bromostyrene, m-bromostyrene, p-bromo-styrene, 2,4-dibromostyrene, 2,6-dibromostyrene or 2,4,6-tribromostyrene), fluorostyrenes (for example o-fluorostyrene, m-fluorostyrene, p-fluorostyrene, 2,4-difluorostyrene, 2,6-difluorostyrene or 2,4,6-trifluorostyrene) or else para-hydroxystyrene.

More preferentially, the vinylaromatic monomer containing from 8 to 20 atoms is chosen from the group constituted by styrene, ortho-methylstyrene, meta-methylstyrene, para-methylstyrene, the "vinyl-toluene" commercial mixture, para-tert-butyl styrene, methoxy styrenes, chlorostyrenes, vinylmesitylene, divinylbenzene, vinylnaphthalene and mixtures of these monomers.

Even more preferentially, the vinylaromatic monomer containing from 8 to 20 carbon atoms is styrene.

To summarize, the synthetic diene elastomer that may be used in the context of the invention is preferentially chosen from the group constituted by polybutadienes (abbreviated as BR), synthetic polyisoprenes (abbreviated as IR), butadiene copolymers, isoprene copolymers and mixtures of these elastomers. Such copolymers are more preferentially chosen from the group constituted by butadiene/styrene copolymers (abbreviated as SBR), isoprene/butadiene copolymers (abbreviated as BIR), isoprene/styrene copolymers (abbreviated as SIR) and isoprene/butadiene/styrene copolymers (abbreviated as SBIR).

Preferentially, the synthetic diene elastomer that may be used in the resin-extended elastomer in accordance with the invention is a butadiene/styrene copolymer.

In the case of copolymers of the type (b), they may contain from 20% to 99% by weight of diene units and from 1% to 80% by weight of vinylaromatic units.

Preferentially, when the synthetic diene elastomer that may be used in the context of the present invention comprises vinylaromatic monomers containing from 8 to 20 carbon atoms (notably this monomer is styrene), the content of this monomer is in a range extending from 3% to 20% by weight relative to the total weight of the elastomer, more preferentially extending from 5% to 16% by weight relative to the total weight of the elastomer.

Preferentially, when the synthetic diene elastomer that may be used in the context of the present invention comprises vinylaromatic monomers containing from 8 to 20 carbon atoms (notably this monomer is styrene) and 1,3-butadiene monomers, the content of 1,2-vinyl butadiene units is in a range extending from 4% to 30% by weight relative to the total weight of the polybutadiene part, more preferentially extending from 5% to 25% by weight relative to the total weight of the polybutadiene part.

The synthetic diene elastomers that may be used in the context of the present invention may have any microstructure, which depends on the polymerization conditions used, notably on the presence or absence of a modifying and/or randomizing agent and on the amounts of modifying and/or randomizing agent employed.

The synthetic diene elastomers that may be used in the context of the present invention may be, for example, block, random, sequential or microsequential elastomers and are synthesized in solution; they may be coupled and/or star-branched or even functionalized with a coupling and/or star-branching or functionalization agent. Preferentially, in the case of a copolymer based on conjugated diene monomers containing from 4 to 12 carbon atoms (notably 1,3-butadiene) and on vinylaromatic monomers containing from 8 to 20 carbon atoms (notably styrene), these two monomers are randomly distributed along the polymer chain.

In one embodiment of the invention, the synthetic diene elastomers that may be used in the context of the present invention may be synthetic diene elastomers functionalized with a function chosen from the group constituted by functional groups including a carbon-tin bond, amino functional groups, functional groups including a silanol, functional groups including an alkoxysilane, carboxylic groups, polyether groups, epoxide groups and mixtures thereof.

For coupling to carbon black, mention may be made, for example, of functional groups comprising a C—Sn bond, or amino functional groups, such as aminobenzophenone, for example. For coupling to a reinforcing inorganic filler, such as a silica, mention may be made, for example, of silanol or polysiloxane functional groups bearing a silanol end (as described, for example, in FR 2 740 778 or U.S. Pat. No. 6,013,718 and WO 2008/141702), alkoxysilane groups (as described, for example, in FR 2 765 882 or U.S. Pat. No. 5,977,238), carboxyl groups (as described, for example, in WO 01/92402 or U.S. Pat. No. 6,815,473, WO 2004/096865 or US 2006/0089445) or else polyether groups (as described, for example, in EP 1 127 909 or U.S. Pat. No. 6,503,973, WO 2009/000750 and WO 2009/000752). Functional elastomers that may also be mentioned include those prepared using a functional initiator, notably those bearing an amine or tin function (see, for example, WO 2010/072761). As other examples of functionalized elastomers, mention may also be made of elastomers (such as SBR, BR or synthetic IR) of the epoxidized type.

This function is preferentially chosen from the group constituted by functional groups including a carbon-tin bond, amino functional groups, functional groups including a silanol, and functional groups including an alkoxysilane.

Even more preferentially, this function is chosen from the group constituted by functional groups including a silanol and functional groups including an alkoxysilane.

The functional group bearing the function may be located at the chain end, that is to say at one end of the linear main elastomer chain. It will then be said that the diene elastomer is functionalized "at the chain end". It is generally an elastomer obtained by reaction of a living elastomer with a functionalization agent, that is to say any at least monofunctional molecule, the function being any type of chemical group known by those skilled in the art to react with a living chain end.

This chemical group may be located in the linear main elastomer chain. It will then be said that the diene elastomer is coupled or else functionalized "in the middle of the chain", in contrast to the position "at the chain end", although the group is not located precisely at the middle of the elastomer chain. It is generally an elastomer obtained by reaction of two chains of the living elastomer with a coupling agent, that is to say any at least difunctional molecule, the function being any type of chemical group known to those skilled in the art to react with a living chain end.

This group may be central, to which n elastomer chains (n>2) are bonded, forming a star-branched structure of the elastomer. It will then be said that the diene elastomer is star-branched. It is generally an elastomer obtained by reaction of n chains of the living elastomer with a star-branching agent, that is to say any polyfunctional molecule, the function being any type of chemical group known to those skilled in the art to react with a living chain end.

A person skilled in the art will understand that a functionalization reaction with an agent comprising more than one function which is reactive with regard to the living elastomer results in a mixture of species functionalized at the chain end and in the middle of the chain, constituting the linear chains of the functionalized diene elastomer, and also, where appropriate, star-branched species. Depending on the operating conditions, mainly the mole ratio of the functionalization agent to the living chains, certain species are predominant in the mixture.

Preferentially, the synthetic diene elastomers that may be used in the context of the present invention bear a functional group in the middle of the chain or at the chain end, more preferentially at the chain end.

The synthetic diene elastomers that may be used in the context of the present invention have a high number-average molar mass Mn, i.e. an Mn of greater than or equal to 200 000 g/mol. A person skilled in the art knows how to adapt the conditions for synthesizing the synthetic diene elastomers to obtain such Mn values. The Mn is measured according to the method described in paragraph 1.1.

Preferentially, the synthetic diene elastomers that may be used in the context of the present invention have an Mn of less than or equal to 500 000 g/mol; more preferentially in a range extending from 250 000 g/mol to 450 000 g/mol.

Preferentially, the synthetic diene elastomers that may be used in the context of the present invention are low-Tg elastomers. The term "low-Tg" means a Tg of less than or equal to −60° C. A person skilled in the art knows how to adapt the microstructure of the synthetic diene elastomers to obtain such Tg values. It is understood that the Tg of the synthetic diene elastomer included in the formulation of the resin-extended elastomer is measured on the synthetic diene elastomer prior to mixing it with the plasticizing hydrocarbon-based resin. The Tg is measured according to the method described in paragraph 1.3.

Preferentially, the synthetic diene elastomers that may be used in the context of the present invention have a Tg in a range extending from −110° C. to −60° C., more preferentially extending from −95° C. to −65° C.

The synthetic diene elastomers that may be used in the context of the present invention are obtained by solution polymerization, preferably homogeneous solution polymerization. Any type of solution polymerization that is well known to a person skilled in the art may be used, for instance anionic polymerization or coordination polymerization.

Solution polymerization is well known to those skilled in the art and differs from emulsion polymerization (or polymerization in dispersed medium) in that the monomers used and the elastomer undergoing synthesis are soluble in the polymerization solvent. At the end of the polymerization reaction, the elastomer formed is also soluble in the polymerization solvent and is recovered by evaporation of said solvent or by filtration. In this type of polymerization, the polymerization solvent is very often a hydrocarbon-based solvent. In contrast, in an emulsion polymerization, the polymerization solvent is water or an aqueous solution and the polymerizable monomer is insoluble in this polymerization solvent. Micelles in which the polymerization reaction takes place are then formed. At the end of an emulsion polymerization (or a polymerization in dispersed medium), an elastomer in latex form is obtained, i.e. a stable emulsion of elastomer particles in an aqueous solution. The synthetic diene elastomers that may be used in the context of the present invention synthesized in solution are therefore not in latex form.

Plasticizing Hydrocarbon-Based Resin

The second constituent of the resin-extended elastomer in accordance with the invention is a plasticizing hydrocarbon-based resin.

As is known to a person skilled in the art, the term "resin" is reserved in the present patent application, by definition, for a compound which is solid at room temperature (23° C.), as opposed to a plasticizing agent that is liquid at room temperature such as an oil.

Plasticizing resins are polymers that are well known to those skilled in the art. These are hydrocarbon-based resins essentially based on carbon and hydrogen, but which may include other types of atoms, which can be used in particular as plasticizing agents or tackifying agents in polymer matrices. They are by nature miscible (i.e. compatible) at the contents used with the compositions of diene elastomer(s) for which they are intended, so as to act as true diluents. They have been described, for example, in the book entitled "Hydrocarbon Resins" by R. Mildenberg, M. Zander and G. Collin (New York, V C H, 1997, ISBN 3-527-28617-9), Chapter 5 of which is devoted to their applications, notably in the tyre rubber field (5.5. "Rubber Tires and Mechanical Goods"). They may be aliphatic, cycloaliphatic, aromatic, hydrogenated aromatic, or of the aliphatic/aromatic type, that is to say based on aliphatic and/or aromatic monomers. They may be natural or synthetic and may or may not be petroleum-based (if such is the case, they are also known under the name of petroleum resins). They are preferentially exclusively hydrocarbon-based, i.e. they include only carbon and hydrogen atoms. Their Tg is preferably greater than or equal to 0° C., preferably greater than or equal to 20° C. (usually in a range extending from 30° C. to 95° C.). In the present patent application, the terms "plasticizing resins", "hydrocarbon-based resins" and "plasticizing hydrocarbon-based resins" are interchangeable.

In a known manner, these plasticizing hydrocarbon-based resins may also be termed thermoplastic resins in the sense that they soften when heated and can thus be moulded. They may also be defined by a softening point or temperature. The softening point of a plasticizing hydrocarbon-based resin is generally higher by about 50° C. to 60° C. than its Tg value. The softening point is measured according to the standard ISO 4625 of 2012 (ring and ball method).

Preferentially, the plasticizing hydrocarbon-based resin that may be used in the context of the present invention has a Tg of greater than or equal to 0° C., preferably greater than or equal to 20° C., preferably greater than or equal to 30° C. (in particular between 30° C. and 95° C.). It is understood that the Tg of the plasticizing hydrocarbon-based resin included in the formulation of the resin-extended elastomer in accordance with the invention is measured on the plasticizing hydrocarbon-based resin prior to mixing it with the synthetic diene elastomer. The Tg of the plasticizing hydrocarbon-based resin is measured according to the method described in paragraph 1.3.

Preferentially, the plasticizing hydrocarbon-based resin that may be used in the context of the present invention has a softening point of greater than or equal to 50° C. (in particular between 50° C. and 150° C.) measured according to the standard ISO 4625 of 2012 (ring and ball method).

Preferentially, the plasticizing hydrocarbon-based resin that may be used in the context of the present invention has a number-average molar mass (Mn) of between 400 and 2000 g/mol, preferentially between 500 and 1500 g/mol. The Mn of the plasticizing hydrocarbon-based resin is measured according to the method described in paragraph 1.2.

Preferentially, the plasticizing hydrocarbon-based resin that may be used in the context of the present invention has a polydispersity index (PDI) of less than 3 (reminder: PDI=Mw/Mn with Mw the weight-average molar mass).

More preferentially, the plasticizing hydrocarbon-based resin that may be used in the context of the present invention has a Tg of greater than or equal to 20° C., preferably greater than or equal to 30° C., and an Mn of between 400 and 2000 g/mol, preferentially between 500 and 1500 g/mol.

More preferentially, the plasticizing hydrocarbon-based resins that may be used in the context of the present invention may have all of the preferential characteristics above.

Preferentially, the plasticizing hydrocarbon-based resin that may be used in the context of the present invention is chosen from the group constituted by aliphatic resins, aromatic resins and mixtures of these resins.

As examples of such plasticizing hydrocarbon-based resins that may be used in the context of the present invention, mention may be made of those chosen from the group constituted by cyclopentadiene (abbreviated as CPD) homopolymer or copolymer resins, dicyclopentadiene (abbreviated as DCPD) homopolymer or copolymer resins, terpene homopolymer or copolymer resins, C5 fraction homopolymer or copolymer resins, C9 fraction homopolymer or copolymer resins, mixtures of C5 fraction homopolymer or copolymer resins and of C9 fraction homopolymer or copolymer resins, α-methylstyrene homopolymer or copolymer resins, and mixtures of these resins.

Among the above copolymer plasticizing hydrocarbon-based resins, mention may be made more particularly of those chosen from the group constituted by CPD/vinylaromatic copolymer resins, DCPD/vinylaromatic copolymer resins, CPD/terpene copolymer resins, DCPD/terpene copolymer resins, terpene/phenol copolymer resins, CPD/C5 fraction copolymer resins, DCPD/C5 fraction copolymer resins, CPD/C9 fraction copolymer resins, DCPD/C9 fraction copolymer resins, mixtures of C5 fraction and C9 fraction resins, terpene/vinylaromatic copolymer resins, terpene/phenol copolymer resins, C5 fraction/vinylaromatic copolymer resins, and mixtures of these resins.

The term "terpene" groups together here, in a known manner, α-pinene, β-pinene and limonene monomers; use is preferably made of a limonene monomer, this compound existing, in a known manner, in the form of three possible isomers: L-limonene (laevorotatory enantiomer), D-limonene (dextrorotatory enantiomer) or else dipentene, the racemate of the dextrorotatory and laevorotatory enantiomers.

Vinylaromatic monomers that are suitable for use, for example, include styrene, α-methylstyrene, ortho-methylstyrene, meta-methylstyrene, para-methylstyrene, vinyltoluene, para(tert-butyl)styrene, methoxystyrenes, chlorostyrenes, hydroxystyrenes, vinylmesitylene, divinylbenzene, vinylnaphthalene or any vinylaromatic monomer derived from a C9 fraction (or more generally from a C8 to C10 fraction).

Even more preferentially, the plasticizing hydrocarbon-based resins that may be used in the context of the present invention are a resin of C5 fraction/C9 fraction copolymers or a mixture of these resins.

All the above plasticizing hydrocarbon-based resins are well known to those skilled in the art and are commercially available, for example sold by the company DRT under the name Dercolyte as regards polylimonene resins, by the company Neville Chemical Company under the name Super Nevtac, by Kolon under the name Hikorez or by the company ExxonMobil under the name Escorez as regards C5 fraction/styrene resins or C5 fraction/C9 fraction resins, or else by the company Struktol under the name 40 MS or 40 NS (mixtures of aromatic and/or aliphatic resins).

Resin-Extended Elastomer

Intimate mixing of a synthetic diene elastomer as described above (including its preferred embodiments) and of a plasticizing hydrocarbon-based resin as described above (including its preferred embodiments) makes it possible to obtain a new material: a resin-extended elastomer. Given that the two constituents of this material are intimately mixed with each other, a single Tg value is obtained when this parameter is measured for the resin-extended elastomer. This Tg of the resin-extended elastomer is different from that of the synthetic diene elastomer and from that of the plasticizing hydrocarbon-based resin measured before they are mixed. Surprisingly, this resin-extended elastomer has a good Mooney viscosity, which supposes good processability. The resin-extended elastomer in accordance with the invention has the advantage of being able to be used for the manufacture of a rubber composition, notably intended for the manufacture of tyres. Its use in compositions of this type allows better processability of the composition in the various mixing tools. It limits the tack of rubber compositions containing it when compared with a rubber composition comprising an elastomer of the same microstructure but not resin-extended and the same content of hydrocarbon-based resin. Thus, the rubber composition comprising the resin-extended elastomer in accordance with the invention has better processability and damages the mixing tools very little or not at all.

Preferably, the resin-extended elastomer in accordance with the present invention has a Mooney viscosity (measured according to the method described in paragraph 1.6) of greater than or equal to 40 MU (with MU=Mooney units and 1 MU=0.83 N·m), more preferentially in a range extending from 50 to 75 MU.

Preferentially, the content of plasticizing hydrocarbon-based resin in the resin-extended elastomer is in a range extending from 5 to 100 phr, preferably from 30 to 80 phr.

Preferentially, the resin-extended elastomer in accordance with the invention may be obtained by mixing the synthetic diene elastomer in solution in an organic solvent and the plasticizing hydrocarbon-based resin in the liquid state.

For the purposes of the present invention, the term "synthetic diene elastomer in solution" means a homogeneous solution of a synthetic diene elastomer, i.e. the organic solvent and said elastomer form only one phase that is visible to the naked eye. There is no precipitate or suspension of particles of said elastomer in the solution.

The organic solvent may be any solvent that is compatible with the monomers of the synthetic diene elastomer, with the synthetic diene elastomer and with the plasticizing hydrocarbon-based resin. Preferably, the organic solvent is aliphatic or alicyclic. Examples that may be mentioned include n-pentane, isopentane, isoamylenes (2-methyl-2-butene, 2-methyl-1-butene and 3-methyl-1-butene), 2,2-dimethylbutane, 2,2-dimethylpropane (neopentane), n-heptane, n-octane, isooctane, cyclopentane, cyclohexane, n-hexane, methylcyclopentane and methylcyclohexane, and also mixtures of these compounds. Organic solvents that may also be mentioned include aromatic hydrocarbons, for instance benzene or toluene.

For the purposes of the present invention, the term "plasticizing hydrocarbon-based resin in the liquid state" means a plasticizing hydrocarbon-based resin which is in the solid state at room temperature and which has undergone a process to pass to the liquid state. For example, the plasticizing hydrocarbon-based resin may be heated, via any technique well known to those skilled in the art, to a temperature above its softening point. Another example for obtaining a plasticizing hydrocarbon-based resin in the liquid state consists in dissolving said hydrocarbon-based resin in an organic solvent with which it is compatible. This technique is also well known to those skilled in the art. This organic solvent may be identical to or different from the solvent in which the synthetic diene elastomer is present in solution. When the organic solvent used to dissolve the plasticizing hydrocarbon-based resin is different from the organic solvent in which the synthetic diene elastomer is present, then the solvent for dissolving the resin must be compatible with that in which the elastomer is present. The term "compatible" means that the mixture of these two solvents forms only one phase that is visible to the naked eye.

2.2. Process for Obtaining the Resin-Extended Elastomer

The invention also relates to a process for obtaining a resin-extended elastomer, the process comprising at least:
(a) one step of placing at least one synthetic diene elastomer in solution in an organic solvent in contact with at least one plasticizing hydrocarbon-based resin, said synthetic diene elastomer having a number-average molar mass of greater than or equal to 200 000 g/mol.
(b) one mixing step to obtain a homogeneous solution of synthetic diene elastomer and of plasticizing hydrocarbon-based resin,
(c) one steam stripping step to recover a gaseous fraction enriched in organic solvent and an aqueous dispersion of particles of synthetic diene elastomer and of plasticizing hydrocarbon-based resin; and
(d) one step of recovering the resin-extended elastomer from the aqueous dispersion of particles of synthetic diene elastomer and of plasticizing hydrocarbon-based resin.

This process for obtaining a resin-extended elastomer may be a batchwise or continuous process.

The first step of the process concerns the placing of at least one synthetic diene elastomer in solution in an organic solvent in contact with at least one plasticizing hydrocarbon-based resin, said synthetic diene elastomer having a number-average molar mass of greater than or equal to 200 000 g/mol. This placing in contact may be performed in any reactor that is well known to those skilled in the art.

The solvent in which the synthetic diene elastomer is present may be any inert hydrocarbon-based solvent, which is preferably aliphatic or alicyclic. Examples that may be mentioned include n-pentane, isopentane, isoamylenes (2-methyl-2-butene, 2-methyl-1-butene and 3-methyl-1-butene), 2,2-dimethylbutane, 2,2 dimethylpropane (neopentane), n-heptane, n-octane, isooctane, cyclopentane, cyclohexane, n-hexane, methylcyclopentane and methylcyclohexane, and also mixtures of these compounds. Organic solvents that may also be mentioned include aromatic hydrocarbons, for instance benzene or toluene.

In the process in accordance with the invention, the synthetic diene elastomer in solution in the organic solvent may be obtained either by dissolution of said elastomer in said organic solvent or by solution polymerization in said organic solvent of the corresponding monomers of said elastomer.

The dissolution of the synthetic diene elastomer is performed via any method that is well known to those skilled in the art, for example by immersing the beads of said elastomer in a reactor filled with the organic solvent and stirring the reaction medium, optionally while also heating it, so as to obtain a synthetic diene elastomer dissolved in the solvent.

In one variant of the process in accordance with the invention, the synthetic diene elastomer in solution is obtained by solution polymerization in said organic solvent of the corresponding monomers of said elastomer. In other words, prior to step (a), the process of the invention may comprise a step (a') in which a synthetic diene elastomer is polymerized in solution, preferably in homogeneous solution (i.e. in the abovementioned organic solvent), from the corresponding monomers. In this step (a'), preferably, at least one conjugated diene monomer containing from 4 to 12 carbon atoms is polymerized. This conjugated diene monomer containing 4 to 12 carbon atoms may be chosen from the group constituted by 1,3-butadiene, 2-methyl-1,3-butadiene, 2,3-di($C_1$-$C_5$ alkyl)-1,3-butadienes, for instance 2,3-dimethyl-1,3-butadiene, 2,3-diethyl-1,3-butadiene, 2-methyl-3-ethyl-1,3-butadiene, 2-methyl-3-isopropyl-1,3-butadiene, 1,3-pentadiene or 2,4-hexadiene, and mixtures of these monomers. More preferentially, the conjugated diene monomer containing 4 to 12 carbon atoms is chosen from the group constituted by 1,3-butadiene, 2-methyl-1,3-butadiene, and mixtures of these monomers. According to embodiments of the process of the invention, the conjugated diene monomer containing 4 to 12 carbon atoms (first monomer) may also be copolymerized with at least one other polymerizable monomer, which may notably be:
- a conjugated diene monomer containing from 4 to 12 carbon atoms other than the first monomer;
- a vinylaromatic monomer containing from 8 to 20 carbon atoms;
- an α-olefin monomer, such as propylene, 1-butene, isobutylene, pentene, methylpentene or 1-hexene;
- ethylene.

Preferentially, the other polymerizable monomer is a vinylaromatic monomer containing from 8 to 20 carbon atoms. Vinylaromatic compounds that are notably suitable for use include styrene monomers, namely any monomer, unsubstituted or substituted, comprising styrene. Among the substituted styrenes, examples that may be mentioned include methylstyrenes (for example o-methylstyrene, m-methylstyrene or p-methylstyrene, α-methylstyrene, α-2-dimethylstyrene, α-4-dimethylstyrene or diphenyl ethylene), para-tert-butylstyrene, chlorostyrenes (for example o-chlorostyrene, m-chlorostyrene, p-chlorostyrene, 2,4-dichlorostyrene, 2,6-dichlorostyrene or 2,4,6-trichlorostyrene), bromostyrenes (for example o-bromostyrene, m-bromostyrene, p-bromo-styrene, 2,4-dibromostyrene, 2,6-dibromostyrene or 2,4,6-tribromostyrene), fluorostyrenes (for example o-fluorostyrene, m-fluorostyrene, p-fluorostyrene, 2,4-difluorostyrene, 2,6-difluorostyrene or 2,4,6-trifluorostyrene) or else para-hydroxystyrene. Preferentially, the vinylaromatic monomer containing from 8 to 20 carbon atoms of the synthetic elastomer that may be used in the process in accordance with the invention is chosen from the group constituted by styrene, ortho-methylstyrene, meta-methylstyrene, para-methylstyrene, the "vinyl-toluene" commercial mixture, para-tert-butyl styrene, methoxy styrenes, chlorostyrenes, vinylmesitylene, divinylbenzene, vinylnaphthalene, and mixtures of these monomers. Even more preferentially, the vinylaromatic monomer containing from 8 to 20 carbon atoms is styrene. Thus, in one embodiment of the process of the invention, step (a') of the process is a step in which a diene elastomer is polymerized in solution, preferably in homogeneous solution, starting with at least one conjugated diene monomer containing from 4 to 12 carbon atoms (preferably, this monomer is 1,3-butadiene or 2-methyl-1,3-butadiene) and at least one vinylaromatic monomer containing from 8 to 20 carbon atoms (preferably styrene).

The polymerization may be an anionic polymerization or a chain polymerization by catalysis (according to the coordination-insertion mechanism). These types of polymerizations are well known to those skilled in the art and have been abundantly described in the literature.

Briefly, in the context of an anionic polymerization, it is initiated, for example, by means of a polymerization initiator which may be any known monofunctional or polyfunctional anionic initiator. However, an initiator containing an alkali metal, such as lithium, or an alkaline-earth metal, such as barium, is preferentially used. Organolithium initiators that are suitable for use notably include those including one or more carbon-lithium bonds such as n-butyllithium (n-BuLi), or lithium amides.

Briefly, in the context of a chain polymerization by coordination catalysis, use is made of a catalytic system based on a rare-earth metal or titanium. Such systems have notably been described in WO 02/38636, WO 03/097708 and WO 2007/045417.

In one embodiment of the process of the invention, said process may also comprise a step (a") in which the synthetic diene elastomer obtained in step (a') is modified. This step consists in introducing a chemical function into the chain of the polymer undergoing synthesis or at the chain end. Such processes have been notably described in patent applications WO 2009/133068 and WO 2011/042507.

Preferentially, in the process in accordance with the invention, the synthetic diene elastomer may be functionalized with a function chosen from the group constituted by functional groups including a carbon-tin bond, amino functional groups, functional groups including a silanol, functional groups including an alkoxysilane, carboxylic groups, polyether groups, epoxide groups and mixtures thereof.

More preferentially, in the process in accordance with the invention, the synthetic diene elastomer may be functionalized with a function chosen from the group constituted by functional groups including a carbon-tin bond, amino functional groups, functional groups including a silanol, functional groups including an alkoxysilane, and mixtures thereof.

Preferentially, in the process in accordance with the invention, the synthetic diene elastomer dissolved in the organic solvent or obtained at the end of step (a') and/or (a") has a number-average molar mass of less than or equal to 500 000 g/mol. Preferably, said synthetic diene elastomer has a number-average molar mass in a range extending from 250 000 g/mol to 450 000 g/mol. The Mn is measured according to the method described in paragraph 1.1.

Preferentially, in the process in accordance with the invention, the synthetic diene elastomer dissolved in the organic solvent or obtained at the end of step (a') and/or (a") has a glass transition temperature of less than or equal to −60° C. Preferably, said synthetic diene elastomer has a glass transition temperature in a range extending from −110° C. to −60° C., preferably from −95° C. to −65° C. The Tg is measured according to the method described in paragraph 1.3.

The resin used in the process of the invention during step (a) is a plasticizing hydrocarbon-based resin. As indicated previously, this plasticizing hydrocarbon-based resin is in the solid state at room temperature (23° C.). These plasticizing hydrocarbon-based resins may also be termed thermoplastic resins in the sense that they soften when heated and can thus be moulded. They may also be defined by a softening point or temperature. The softening point of a plasticizing resin is generally about 50 to 60° C. above its Tg value. The softening point is measured according to the standard ISO 4625 of 2012 (ring and ball method).

Preferentially, the plasticizing hydrocarbon-based resin that may be used in the process of the invention has a Tg of greater than or equal to 0° C., preferably greater than or equal to 20° C., preferably greater than or equal to 30° C. (in particular between 30° C. and 95° C.). The Tg is measured according to the method described in paragraph 1.3.

Preferentially, the plasticizing hydrocarbon-based resin that may be used in the process of the invention has a softening point of greater than or equal to 50° C. (in particular between 50° C. and 150° C.) measured according to the standard ISO 4625 of 2012 (ring and ball method).

Preferentially, the plasticizing hydrocarbon-based resin that may be used in the process of the invention has a number-average molar mass (Mn) of between 400 and 2000 g/mol, preferentially between 500 and 1500 g/mol. The Mn is measured according to the method described in paragraph 1.2.

Preferentially, the plasticizing hydrocarbon-based resin that may be used in the process of the invention has a polydispersity index (PDI) of less than 3 (reminder: PDI=Mw/Mn with Mw the weight-average molar mass). More preferentially, the plasticizing hydrocarbon-based resin in the process of the invention has a Tg of greater than or equal to 20° C., preferably greater than or equal to 30° C., and an Mn of between 400 and 2000 g/mol, preferentially between 500 and 1500 g/mol.

More preferentially, the plasticizing hydrocarbon-based resin that may be used in the process of the invention may have all of the preferential characteristics above.

Preferentially, the plasticizing hydrocarbon-based resin that may be used in the process of the invention is chosen from the group constituted by aliphatic resins, aromatic resins and mixtures of these resins.

As examples of such plasticizing hydrocarbon-based resins that may be used in the context of the present invention, mention may be made of those chosen from the group constituted by cyclopentadiene (abbreviated as CPD) homopolymer or copolymer resins, dicyclopentadiene (abbreviated as DCPD) homopolymer or copolymer resins, terpene homopolymer or copolymer resins, C5 fraction homopolymer or copolymer resins, C9 fraction homopolymer or copolymer resins, mixtures of C5 fraction homopolymer or copolymer resins and of C9 fraction homopolymer or copolymer resins, α-methylstyrene homopolymer or copolymer resins, and mixtures of these resins.

Preferentially, during the placing in contact in step (a), the plasticizing hydrocarbon-based resin is in the liquid state. In other words, the plasticizing hydrocarbon-based resin in the liquid state may thus preferentially be injected, via any suitable means known to those skilled in the art, into the solution of solvent containing the synthetic diene elastomer.

According to one embodiment of the process of the invention, the plasticizing hydrocarbon-based resin in the liquid state may be obtained by heating said resin to a temperature greater than or equal to its softening point. This heating step is performed via any means well known to those skilled in the art, for example using a reactor comprising heating and stirring means. A person skilled in the art knows how to determine the temperature at which the heating is performed and the heating time, as a function of the plasticizing hydrocarbon-based resin used, so as to obtain a plasticizing hydrocarbon-based resin in the liquid state, the viscosity of which allows it to be pumped so as to be used in step (a). The temperature at which the heating is performed is greater than or equal to the softening point of said resin. By way of example, the plasticizing hydrocarbon-based resin may be heated to a temperature ranging from 50° C. to 200° C. for a time in a range extending from 10 minutes to 2 hours.

According to another embodiment of the process of the invention, the plasticizing hydrocarbon-based resin in the liquid state may be obtained by dissolving said resin in an organic solvent identical to or different from the organic solvent in which the synthetic diene elastomer is present. A person skilled in the art knows how to select the appropriate solvent as a function of the plasticizing hydrocarbon-based resin used. Preferentially, this organic solvent may be any inert hydrocarbon-based solvent, which is preferably aliphatic or alicyclic. Examples that may be mentioned include n-pentane, isopentane, isoamylenes (2-methyl-2-butene, 2-methyl-1-butene and 3-methyl-1-butene), 2,2-dimethylbutane, 2,2 dimethylpropane (neopentane), n-heptane, n-octane, isooctane, cyclopentane, cyclohexane, n-hexane, methylcyclopentane and methylcyclohexane, and also mixtures of these compounds. Organic solvents that may also be mentioned include aromatic hydrocarbons, for instance benzene or toluene. Preferentially, the organic solvent in which the plasticizing hydrocarbon-based resin is dissolved is identical to the one in which the synthetic diene elastomer is present. The dissolution of the plasticizing hydrocarbon-based resin may take place at room temperature or by heating the plasticizing hydrocarbon-based resin/organic solvent mixture. It is understood that when this mixture is heated, the heating temperature should not be greater than the boiling point of the organic solvent, to prevent said solvent from evaporating.

The mixing step of the process in accordance with the invention (step (b)) is performed by any means well known to those skilled in the art, for example with stirring and optionally heating the reaction medium. This step makes it possible to obtain a homogeneous solution of synthetic diene elastomer and of plasticizing hydrocarbon-based resin. The stirring may take place, for example, with stirring mobiles in the reactor. For the purposes of the present invention, the term "homogeneous solution of synthetic diene elastomer and of plasticizing hydrocarbon-based resin" means that the solution of synthetic diene elastomer and the plasticizing hydrocarbon-based resin in the liquid state after mixing form only a single liquid phase to the naked eye. There is no precipitate and no particles in suspension in the reaction medium.

The process in accordance with the invention then comprises a step of steam stripping. The steam stripping step is well known to those skilled in the art and makes it possible to recover a gaseous fraction enriched in organic solvent and an aqueous dispersion of particles of synthetic diene elastomer and of plasticizing hydrocarbon-based resin. It is performed in a stripping column. A person skilled in the art knows how to adapt, as a function of the amount of organic solvent and optionally of the amount of unconverted monomers present at the inlet of the stripping column, the amount of steam to be supplied to recover the elastomer in the form of an aqueous dispersion of particles of synthetic diene elastomer and of plasticizing hydrocarbon-based resin.

On contact with the steam and the water present in the stripping column, since the synthetic diene elastomer and the plasticizing hydrocarbon-based resin are both hydrophobic, they coagulate spontaneously in the form of particles of synthetic diene elastomer and of plasticizing hydrocarbon-based resin. This coagulation makes it possible to trap the hydrocarbon-based resin in the synthetic diene elastomer and to form the resin-extended elastomer. Since the organic solvent is volatile, it is entrained with the steam and a gaseous fraction enriched in organic solvent is obtained.

Preferentially, this gaseous fraction enriched in organic solvent may, after treatment, be recycled into step (a). The recycled organic solvent may thus serve as polymerization solvent or as solvent for dissolving the plasticizing hydrocarbon-based resin or the synthetic diene elastomer.

The step of recovering the resin-extended elastomer from the aqueous dispersion of particles of synthetic diene elastomer and of plasticizing hydrocarbon-based resin is well known to those skilled in the art and may be performed via any conventional means for separating a solid and a fluid, such as decantation, centrifugation (draining), filtration or drying. Preferably, the recovery of the resin-extended elastomer is performed by drying the aqueous dispersion of particles of synthetic diene elastomer and of plasticizing hydrocarbon-based resin, for example by placing said dispersion in a temperature-controlled oven or by sending this suspension into a roll mill. The aim of step (d) is to remove the aqueous solution so as to recover the resin-extended elastomer in accordance with the invention in the form of a dry solid.

Preferentially, prior to the recovery step (d), the process in accordance with the invention may comprise at least one step (c') of washing the aqueous dispersion of particles of synthetic diene elastomer and of plasticizing hydrocarbon-based resin. This optional step makes it possible to remove the residual impurities that have not been removed, for example, during the steam stripping step.

The resin-extended elastomer may then be recovered and packaged in a manner known per se, for example in the form of balls.

Surprisingly, the resin-extended elastomer as defined above (including its preferred embodiments) or which may be obtained according to the process defined above (including its preferred embodiments), in accordance with the invention, has a satisfactory Mooney viscosity despite the high number-average molar mass of the elastomer used as constituent and the presence of plasticizing resin. This satisfactory Mooney viscosity is a good indicator of the low tackiness of this material. This resin-extended elastomer in accordance with the invention may be advantageously used for application in tyres, in a reinforced rubber composition in which it improves the processability on the mixing mill. This rubber composition also forms the subject of the present invention.

2.3 Rubber Composition

Thus, as explained previously, another subject of the present invention relates to a rubber composition based on at least one resin-extended elastomer as defined above or which may be obtained according to the process described above and on at least one reinforcing filler. It should be understood that the rubber composition may comprise one or more of these resin-extended elastomers in accordance with the invention.

For the purposes of the present invention, the term "composition based on" means a composition including the mixture and/or the reaction product of the various constituents used, some of these base constituents being capable of reacting, or intended to react, with each other, at least in part, during the various phases of manufacture of the composition, in particular during its extrusion or during the mixing phase.

The rubber compositions in accordance with the invention may be in the crosslinked state or in the non-crosslinked, in other words crosslinkable, state.

The resin-extended elastomer in accordance with the invention, including its preferred embodiments, may be used, according to different variants, alone in the compositions or as a blend with at least one other conventional diene elastomer. Preferentially, this other conventional diene elastomer is chosen from the group constituted by polybutadienes, synthetic polyisoprenes, natural rubber, butadiene copolymers, isoprene copolymers and mixtures of these elastomers. Such copolymers are more preferentially chosen from the group constituted by butadiene/styrene copolymers, isoprene/butadiene copolymers, isoprene/styrene copolymers and isoprene/butadiene/styrene copolymers. It is also possible to envisage a blend with any synthetic elastomer other than a diene elastomer, or even with any polymer other than an elastomer, for example a thermoplastic polymer.

Preferentially, the rubber compositions in accordance with the invention comprise as resin-extended elastomer a resin-extended elastomer for which at least any one of the following characteristics is respected:

- the number-average molar mass of the synthetic diene elastomer is less than or equal to 500 000 g/mol.
- the number-average molar mass of the synthetic diene elastomer is in a range extending from 250 000 g/mol to 450 000 g/mol.
- the synthetic diene elastomer comprises at least one conjugated diene monomer containing from 4 to 12 carbon atoms.
- the conjugated diene monomer containing 4 to 12 carbon atoms is chosen from the group constituted by 1,3-butadiene, 2-methyl-1,3-butadiene, 2,3-di($C_1$-$C_5$ alkyl)-1,3-butadienes, 1,3-pentadiene, 2,4-hexadiene and mixtures of these monomers.
- the conjugated diene monomer containing 4 to 12 carbon atoms is chosen from the group constituted by 1,3-butadiene, 2-methyl-1,3-butadiene, and mixtures of these monomers.
- the synthetic diene elastomer also comprises at least one vinylaromatic monomer containing from 8 to 20 carbon atoms.
- the vinylaromatic monomer containing from 8 to 20 carbon atoms is chosen from the group constituted by styrene, ortho-methylstyrene, meta-methylstyrene, para-methylstyrene, the "vinyl-toluene" commercial mixture, para-tert-butylstyrene, methoxystyrenes, chlorostyrenes, vinylmesitylene, divinylbenzene, vinylnaphthalene and mixtures of these monomers.
- the vinylaromatic monomer containing from 8 to 20 carbon atoms is styrene and the conjugated diene monomer containing 4 to 12 carbon atoms is 1,3-butadiene.
- the synthetic diene elastomer is functionalized with a function chosen from the group constituted by functional groups including a carbon-tin bond, amino functional groups, functional groups including a silanol, functional groups including an alkoxysilane, carboxylic groups, polyether groups, epoxide groups and mixtures thereof
- the synthetic diene elastomer is obtained by solution polymerization, preferably by homogeneous solution polymerization.
- the plasticizing hydrocarbon-based resin has a number-average molar mass of between 400 and 2000 g/mol, preferably between 500 and 1500 g/mol.
- the plasticizing hydrocarbon-based resin is chosen from the group constituted by aliphatic resins, aromatic resins and mixtures of these resins.
- the plasticizing hydrocarbon-based resin is chosen from the group constituted by cyclopentadiene homopolymer or copolymer resins, dicyclopentadiene homopolymer or copolymer resins, terpene homopolymer or copolymer resins, C5 fraction homopolymer or copolymer resins, C9 fraction homopolymer or copolymer resins, mixtures of C5 fraction homopolymer or copolymer resins and of C9 fraction homopolymer or copolymer resins, α-methylstyrene homopolymer or copolymer resins, and mixtures of these resins.
- the content of plasticizing hydrocarbon-based resin is in a range extending from 5 to 100 phr, preferably from 30 to 80 phr.
- the resin-extended elastomer is obtained by mixing the synthetic diene elastomer in solution in an organic solvent and the plasticizing hydrocarbon-based resin in the liquid state.

The rubber compositions of the invention comprise at least one reinforcing filler.

Use may be made of any type of reinforcing filler known for its abilities to reinforce a rubber composition which can be used in the manufacture of tyres, for example an organic filler, a reinforcing inorganic filler, or a blend of these two types of filler.

Organic fillers that may notably be mentioned include carbon blacks, and functionalized polyvinyl organic fillers, as described in patent applications WO 2006/069792, WO 2006/069793, WO 2008/003434 and WO 2008/003435.

All carbon blacks, notably blacks of the HAF, ISAF or SAF type, conventionally used in tyres ("tyre-grade" blacks) are suitable for use as carbon blacks. Mention will more particularly be made, among the latter, of the reinforcing carbon blacks of the 100, 200 or 300 series (ASTM grades), for instance the N115, N134, N234, N326, N330, N339, N347 or N375 blacks, or else, depending on the applications targeted, the blacks of higher series (for example N660, N683 or N772). The carbon blacks might, for example, be already incorporated in an elastomer, notably an isoprene elastomer, in the form of a masterbatch (see, for example, patent applications WO 97/36724 and WO 99/16600).

In the present patent application, the term "reinforcing inorganic filler" should be understood, by definition, as meaning any inorganic or mineral filler (regardless of its colour and its origin, natural or synthetic), also known as "white filler", "clear filler" or even "non-black filler", as opposed to carbon black, which is capable of reinforcing by itself alone, without means other than an intermediate coupling agent, a rubber composition intended for the manufacture of tyres, in other words capable of replacing, in its reinforcing role, a conventional tyre-grade carbon black; such a filler is generally characterized, in a known manner, by the presence of hydroxyl (—OH) groups at its surface.

The physical state in which the reinforcing inorganic filler is provided is not important, whether it be in the form of a powder, of micropearls, of granules, of beads or any other appropriate densified form.

Needless to say, the term "reinforcing inorganic filler" also refers to mixtures of different reinforcing inorganic fillers, in particular of highly dispersible siliceous and/or aluminous fillers, as described below.

Mineral fillers of the siliceous type, in particular silica ($SiO_2$), or of the aluminous type, in particular alumina ($Al_2O_3$), are notably suitable for use as reinforcing inorganic fillers. The silica used may be any reinforcing silica known to those skilled in the art, notably any precipitated or fumed silica with a BET specific surface area and a CTAB specific surface area both of less than 450 $m^2/g$, preferably from 30 to 400 $m^2/g$, the BET specific surface area and the CTAB specific surface area being measured as indicated above. What are referred to as highly dispersible silicas ("HDS") may notably be used, for instance the Ultrasil 7000 silicas from the company Evonik, the Zeosil® 1165 MP and Zeosil® 1115 MP silicas from the company Solvay, the Zeosil® Premium 200MP silica from the company Solvay, the Hi-Sil EZ150G silica from the company PPG, the Zeopol 8715, 8745 or 8755 silicas from the company Huber, or the silicas as described in patent applications WO 03/016215 and WO 03/016387.

Needless to say, the term "reinforcing inorganic filler" also refers to mixtures of different reinforcing fillers, in particular of highly dispersible siliceous fillers as described above.

Preferentially, the content of total reinforcing filler (carbon black and/or other reinforcing filler, such as silica) is in a range extending from 10 to 200 phr, more preferentially extending from 30 to 180 phr and even more preferentially extending from 50 to 160 phr, the optimum being, in a known manner, different according to the particular applications targeted.

According to one variant of the invention, the reinforcing filler is predominantly other than carbon black, that is to say that it comprises more than 50% by weight relative to the total weight of the reinforcing filler of one or more reinforcing fillers other than carbon black, notably a reinforcing inorganic filler, such as silica, or even it consists exclusively of such a filler.

According to this variant, when black is also present, it may be used in a content of less than 20 phr, more preferentially less than 10 phr. For example, in this variant, the content of carbon black may be in a range extending from 0.5 to 20 phr and preferably in a range extending from 1 to 10 phr.

According to another variant of the invention, use is made of a reinforcing filler predominantly including carbon black and optionally silica or another inorganic reinforcing filler.

When the reinforcing filler comprises a filler requiring the use of a coupling agent in order to establish a bond between the reinforcing filler and the elastomer, the rubber compositions in accordance with the invention also conventionally comprise a coupling agent capable of effectively providing this bond. For example, when silica is present in the composition as inorganic reinforcing filler, coupling agents that may be used include organosilanes, notably alkoxysilane polysulfides or mercaptosilanes, or else at least bifunctional polyorganosiloxanes. For example, the agent for coupling the filler with the elastomer may be bis(3-triethoxysilylpropyl) tetrasulfide (abbreviated as TESPT).

Such a coupling agent should not be confused with the coupling agents used for the synthesis of the synthetic diene elastomer used as base constituent for forming the resin-extended elastomer.

In the compositions according to the invention, the content of coupling agent is advantageously less than 20 phr, it being understood that it is generally desirable to use as little of it as possible. Its content is preferentially in a range extending from 0.5 to 12 phr. The presence of the coupling agent depends on the presence of the reinforcing inorganic filler. The content of agent for coupling the inorganic reinforcing filler with the elastomer is easily adjusted by a person skilled in the art according to the content of this filler; it is typically of the order of 0.5% to 15% by weight, relative to the weight of reinforcing inorganic filler other than carbon black.

The rubber compositions according to the invention may also comprise at least one crosslinking system based either on sulfur or on sulfur donors and/or on peroxide and/or on bismaleimides, vulcanization accelerators and vulcanization activators.

Preferably, the crosslinking system is preferably a vulcanization system, that is to say a system based on sulfur (or on a sulfur-donating agent) and on a primary vulcanization accelerator. Various known secondary vulcanization accelerators or vulcanization activators, such as zinc oxide, stearic acid or equivalent compounds, or guanidine derivatives (in particular diphenylguanidine), or else known vulcanization retarders, may be added to this base vulcanization system, being incorporated during the first non-productive phase and/or during the productive phase, as are described subsequently.

When sulfur is used, it is used in a preferential content in a range extending from 0.5 to 12 phr, in particular from 1 to 10 phr. The primary vulcanization accelerator may be used in a preferential content in a range extending from 0.5 to 10 phr, more preferentially in a range extending from 0.5 to 5.0 phr.

Use may be made, as (primary or secondary) accelerator, of any compound that is capable of acting as accelerator of the vulcanization of diene elastomers in the presence of sulfur, notably accelerators of the thiazole type and also derivatives thereof, or accelerators of thiuram or zinc dithiocarbamate type. These accelerators are chosen, for example, from the group constituted by 2-mercaptobenzothiazyl disulfide (abbreviated as "MBTS"), tetrabenzylthiuram disulfide ("TBZTD"), N-cyclohexyl-2-benzothiazylsulfenamide ("CBS"), N,N-dicyclohexyl-2-benzothiazylsulfenamide ("DCBS"), N-(tert-butyl)-2-benzothiazylsulfenamide ("TBBS"), N-(tert-butyl)-2-benzothiazylsulfenamide ("TBSP"), zinc dibenzyldithiocarbamate ("ZBEC") and mixtures of these compounds.

The rubber compositions in accordance with the invention as described previously make it possible, by themselves, to solve the posed technical problem; in particular, they adhere little to the mixing mill.

However, the rubber compositions according to the invention may also contain, in addition to the agents for coupling the inorganic reinforcing filler with the elastomer, coupling activators, agents for covering the fillers or more generally processing aids that are capable, in a known manner, by virtue of an improvement in the dispersion of the filler in the composition and of a lowering of the viscosity of the compositions, of improving its ability to be processed in the raw state, these agents being, for example, hydrolysable silanes, such as alkylalkoxysilanes, polyols, polyethers, primary, secondary or tertiary amines, or hydroxylated or hydrolysable polyorganosiloxanes.

Preferentially, the rubber composition in accordance with the invention may comprise, in addition to the plasticizing hydrocarbon-based resin already present in the resin-extended elastomer, another plasticizing hydrocarbon-based resin identical to or different from the one present in the elastomer (additional resin).

Preferentially, the total content of plasticizing resin (resin present in the resin-extended elastomer and optionally additional resin) in the rubber composition according to the invention is in a range extending from 5 to 100 phr, preferably extending from 30 to 90 phr. A person skilled in the art knows how to achieve this total content of plasticizing resin in the rubber compositions.

The rubber compositions in accordance with the invention may also include all or a portion of the usual additives customarily used in elastomer compositions intended for the manufacture of tyres, for instance pigments, non-reinforcing fillers, protective agents such as antiozone waxes, chemical anti-ozonants, antioxidants, anti-fatigue agents, plasticizers, methylene acceptors or methylene donors (for example, HMT or H3M), as described, for example, in patent application WO 02/10269, or a crosslinking system.

Process for Obtaining the Composition

The rubber compositions in accordance with the invention may be manufactured in appropriate mixers, using two successive phases of preparation according to a general procedure well known to those skilled in the art: a first phase of thermomechanical working or kneading (sometimes referred to as the "non-productive" phase) at high temperature, up to a maximum temperature of between 110° C. and 190° C., preferably between 130° C. and 180° C., followed by a second phase of mechanical working (sometimes referred to as the "productive" phase) at lower temperature, typically below 110° C., for example between 40° C. and 100° C., during which finishing phase the crosslinking system (preferably the vulcanization system) is incorporated.

Thus, the present description describes a process for preparing a composition according to the invention, which comprises:
(i) the implementation, at a maximum temperature of between 130° C. and 180° C., of a first stage of thermomechanical working of the constituents of the composition comprising at least one reinforcing filler and at least one resin-extended elastomer as defined above, with the exception of a crosslinking system;
(ii) the implementation, at a temperature below said maximum temperature of said first stage, of a second stage of mechanical working during which said crosslinking system is incorporated.

This process may also comprise, prior to performing the abovementioned steps (i) and (ii), the steps of the process for obtaining said resin-extended elastomer according to the process described above.

More precisely, the first phase (non-productive phase, step (i)) is preferentially performed in several thermomechanical steps. During a first step, the resin-extended elastomer(s), the reinforcing filler(s), optionally the plasticizers (including the addition of additional plasticizing resin and optionally the coupling agents and/or other ingredients), with the exception of the vulcanization system), are introduced into an appropriate mixer, such as an ordinary internal mixer, at a temperature between 20° C. and 100° C. and preferably between 25° C. and 100° C. After a few minutes, preferentially from 0.5 to 2 min, and a rise in the temperature to 90° C. to 100° C., the other ingredients (that is to say, those which remain, if not all were put in at the start) are added all at once or in portions, with the exception of the vulcanization system, during a mixing ranging from 20 seconds to a few minutes. The total duration of the kneading, in this non-productive phase, is preferably between 2 and 10 minutes at a temperature of less than or equal to 180° C. and preferentially of less than or equal to 170° C.

After cooling the mixture thus obtained, the crosslinking system (preferably the vulcanization system) is then incorporated at low temperature (typically below 100° C.), generally in an external mixer, such as an open mill; the combined mixture is then mixed (productive phase, step (ii)) for a few minutes, for example between 5 and 15 min.

The final composition thus obtained is subsequently calendered, for example in the form of a sheet or of a slab, notably for laboratory characterization, or else extruded, in order to form, for example, a rubber profile used in the manufacture of semi-finished products, in order to obtain products such as a tread. These products may then be used in the manufacture of tyres, according to techniques known to those skilled in the art, namely by superposing the layers of semi-finished products on top of each other before curing the tyre.

The crosslinking (or curing or vulcanization) is performed in a known manner at a temperature generally of between 130° C. and 200° C., under pressure, for a sufficient time which may range, for example, between 5 and 90 min, as a function notably of the curing temperature, of the vulcanization system adopted, of the kinetics of vulcanization of the composition under consideration or else of the size of the tyre.

2.4 Semi-Finished Product and Tyre

A subject of the invention is also a semi-finished product for a tyre comprising at least one resin-extended elastomer as described above including its preferred embodiments or which may be obtained according to the process described above including its preferred embodiments.

A subject of the invention is also a semi-finished product for a tyre comprising at least one rubber composition as described above including its preferred embodiments.

On account of the viscosity of the resin-extended elastomer which is favourable towards good processability of rubber compositions containing it, it will be noted that these compositions may be used in any semi-finished product for tyres that is well known to a person skilled in the art, for instance a tread.

A subject of the invention is also a tyre comprising at least one resin-extended elastomer as described above including its preferred embodiments or which may be obtained according to the process described above including its preferred embodiments.

A subject of the invention is also a tyre comprising at least one composition as described above.

The tyre of the invention may notably be intended to equip vehicles. These vehicles may be motor vehicles of passenger vehicle type, SUV ("Sports Utility Vehicles") vehicles, two-wheel vehicles (in particular motorcycles) or aircraft, and industrial vehicles chosen from vans, heavy-duty vehicles—that is to say, underground trains, buses, heavy road transport vehicles (lorries, tractors, trailers) or off-road vehicles, such as agricultural vehicles or construction plant vehicles—or other transportation or handling vehicles.

3—EXAMPLES

The examples that follow illustrate the invention without, however, limiting it.

3.1—Test 1:

The aim of this test is to demonstrate the improved properties in terms of processability of a resin-extended elastomer relative to a control extended elastomer and unextended elastomers.

3.1.1—Synthesis of the Elastomers Studied

Two non-resin-extended elastomers and two resin-extended elastomers are synthesized according to the protocols described below. The glass transition temperatures of the elastomers serving as starting product, of the plasticizing resins serving as starting product and the glass transition temperature of the resin-extended elastomers are measured according to the method described in paragraph 1.3. The number-average molar masses of the elastomer and of the plasticizing resin are measured, respectively, according to the method described in paragraphs 1.1 and 1.2. The viscosities were measured according to the method described in paragraph 1.6. The content of plasticizing resin in the resin-extended elastomers was measured according to the method described in paragraph 1.5.

Elastomer A (Outside the Invention)

Into an 85 litre reactor maintained under a nitrogen pressure of 2 bar, containing 48.4 kg of methylcyclohexane, are injected 5.5 g of butadiene and 1.7 kg of styrene, along with 525 ppm (678 ml) of tetrahydrofuran (THF). After neutralization of the impurities in the solution to be polymerized by addition of n-butyllithium, 1.162 litres of 0.014 mol/l n-butyllithium are added. The reaction medium then takes on a yellow colour. The polymerization is performed at 50° C. After 45 minutes, the degree of conversion of the monomers reaches 68%. This degree is determined by weighing an extract dried at 140° C. under a reduced pressure of 200 mmHg.

The polymer chains are then functionalized by adding hexamethylcyclotrisiloxane to the reactor to a proportion of 0.4 molar equivalent relative to the lithium chain end. The functionalization is performed at 60° C. for 30 minutes.

The polymer chains are neutralized by adding 0.9 part per hundred parts of elastomer (phr) of 4,4'-methylenebis(2,6-di(tert-butyl)phenol) and 0.2 part per hundred parts of elastomer (phr) of N-(1,3-dimethylbutyl)-N'-phenyl-p-phenylenediamine. At the end of the neutralization step, a homogeneous solution of functionalized styrene/butadiene copolymer in the organic solvent is obtained.

The functionalized elastomer is separated from its solution by a steam stripping operation to recover a dispersion of elastomer particles in an aqueous solution. This dispersion is dried on roll mill at 100° C. for 15 minutes.

At the end of the drying step, elastomer A is recovered, the characteristics of which are presented in table I.

Elastomer B (Outside the Invention)

Into an 85 litre reactor maintained under a nitrogen pressure of 2 bar, containing 48.4 kg of methylcyclohexane, are injected 5.5 g of butadiene and 1.7 kg of styrene, along with 525 ppm (678 ml) of THF. After neutralization of the impurities in the solution to be polymerized by addition of n-butyllithium, 1.162 litres of 0.014 mol/l n-butyllithium are added. The reaction medium then takes on a yellow colour. The polymerization is performed at 50° C. After 45 minutes, the degree of conversion of the monomers reaches 68%. This degree is determined by weighing an extract dried at 140° C. under a reduced pressure of 200 mmHg.

The polymer chains are then functionalized by adding hexamethylcyclotrisiloxane to the reactor to a proportion of 0.4 molar equivalent relative to the lithium chain end. The functionalization is performed at 60° C. for 30 minutes.

The polymer chains are neutralized by adding 0.9 part per hundred parts of elastomer (phr) of 4,4'-methylenebis(2,6-di(tert-butyl)phenol) and 0.2 part per hundred parts of elastomer (phr) of N-(1,3-dimethylbutyl)-N'-phenyl-p-phenylenediamine. At the end of the neutralization step, a homogeneous solution of functionalized styrene/butadiene copolymer in the organic solvent is obtained.

The solution of copolymer in methylcyclohexane is then transferred into a 450 litre reactor and stirred for 15 minutes. A solution of 2.34 kg of Escorez 2173 resin dissolved in 4 litres of methylcyclohexane is then added to the copolymer solution. The solution of copolymer and of resin is stirred for two hours at room temperature under a nitrogen pressure of 0.4 bar with a stirring speed of 400 rpm. A homogeneous solution of functionalized styrene/butadiene copolymer and of resin in a solvent is thus obtained.

This homogeneous solution of functionalized styrene/butadiene copolymer and of resin is then subjected to a steam stripping operation in order to recover a dispersion of elastomer/resin particles in an aqueous solution. This dispersion is dried on roll mill at 100° C. for 15 minutes.

At the end of the drying step, the resin-extended elastomer B is recovered, the characteristics of which are presented in table I.

The plasticizing hydrocarbon-based resin is commercially available from ExxonMobil under the reference Escorez 2173. Its characteristics are as follows:
number-average molar mass of about 770 g/mol,
plasticizing resin derived from a C5-C9 hydrocarbon-based fraction,
glass transition temperature of about 39.7° C. (ΔT: 13° C.),
softening point of about 94° C.

Elastomer C (Outside the Invention)

Into an 85 litre reactor maintained under a nitrogen pressure of 2 bar, containing 48.963 kg of methylcyclohexane, are injected 5.23 kg of butadiene and 1.65 kg of styrene, along with 525 ppm (682 ml) of THF. After neutralization of the impurities in the solution to be polymerized by addition of n-butyllithium, 796 ml of 0.014 mol/l n-butyllithium are added. The reaction medium then takes on a yellow colour. The polymerization is performed at 50° C. After 60 minutes, the degree of conversion of the monomers reaches 66.5%. The degree of conversion is determined by weighing an extract dried at 140° C. under a reduced pressure of 200 mmHg.

The polymer chains are then functionalized by adding hexamethylcyclotetrasiloxane to the reactor to a proportion of 0.4 molar equivalent relative to the lithium chain end. The functionalization is performed at 60° C. for 30 minutes.

The polymer chains are neutralized by adding 0.9 part per hundred parts of elastomer (phr) of 4,4'-methylenebis(2,6-di(tert-butyl)phenol) and 0.2 part per hundred parts of elastomer (phr) of N-(1,3-dimethylbutyl)-N'-phenyl-p-phenylenediamine. A homogeneous solution of functionalized styrene/butadiene copolymer in methylcyclohexane is obtained.

The elastomer is separated from its solution by a steam stripping operation in order to recover a dispersion of elastomer particles in an aqueous solution. This dispersion is dried on roll mill at 100° C. for 15 minutes.

At the end of the drying step, elastomer C is recovered, the characteristics of which are presented in table I.

Elastomer D (in Accordance with the Invention)

Into an 85 litre reactor maintained under a nitrogen pressure of 2 bar, containing 48.963 kg of methylcyclohexane, are injected 5.23 kg of butadiene and 1.65 kg of styrene, along with 525 ppm (682 ml) of THF. After neutralization of the impurities in the solution to be polymerized by addition of n-butyllithium, 796 ml of 0.014 mol/l n-butyllithium are added. The reaction medium then takes on a yellow colour. The polymerization is performed at 50° C. After 60 minutes, the degree of conversion of the monomers reaches 66.5%. The degree of conversion is determined by weighing an extract dried at 140° C. under a reduced pressure of 200 mmHg.

The polymer chains are then functionalized by adding hexamethylcyclotrisiloxane to the reactor to a proportion of 0.4 molar equivalent relative to the lithium chain end. The functionalization is performed at 60° C. for 30 minutes.

The polymer chains are neutralized by adding 0.9 part per hundred parts of elastomer (phr) of 4,4'-methylenebis(2,6-di(tert-butyl)phenol) and 0.2 part per hundred parts of elastomer (phr) of N-(1,3-dimethylbutyl)-N'-phenyl-p-phenylenediamine. A homogeneous solution of functionalized styrene/butadiene copolymer in methylcyclohexane is obtained.

The solution of copolymer in methylcyclohexane is then transferred into a 450 litre reactor and stirred for 15 minutes. A solution of 2.17 kg of Escorez 2173 resin dissolved in 4 litres of methylcyclohexane is then added to the copolymer solution. The solution of copolymer and of resin is stirred for two hours at room temperature under a nitrogen pressure of 0.4 bar with a stirring speed of 400 rpm. A homogeneous solution of functionalized styrene/butadiene copolymer and of resin in the solvent is thus obtained.

This homogeneous solution of functionalized styrene/butadiene copolymer and of resin is then subjected to a steam stripping operation in order to recover a dispersion of elastomer/resin particles in an aqueous solution. This dispersion is dried on roll mills at 100° C. for 15 minutes.

At the end of the drying step, an elastomer D is recovered, the characteristics of which are presented in table I.

Characteristics of the Various Elastomers

TABLE I

|  | Elastomer A | Elastomer B | Elastomer C | Elastomer D |
|---|---|---|---|---|
| Average molar mass Mn (g/mol) | 170 600 | 170 600 | 290 000 | 290 000 |
| Polydispersity index PDI | 1.12 | 1.12 | 1.14 | 1.14 |
| Tg in ° C. | −65° C. (ΔT = 6° C.) | −51.7° C. (ΔT = 14.8° C.) | −65° C. (ΔT = 6° C.) | −51° C. (ΔT = 14° C.) |
| Microstructure |  |  |  |  |
| Styrene content $(^a)$ | 15.1% | 15.1% | 14.9% | 14.9% |
| 1,2-Vinyl butadiene content $(^b)$ | 24.6% | 24.6% | 23.6% | 23.6% |
| 1,4-Butadiene content $(^b)$ | 75.4% | 75.4% | 76.4% | 76.4% |
| Plasticizing resin content (in phr) | 0 | 50 | 0 | 50 |

$(^a)$ the monomer content is expressed as a weight percentage relative to the total weight of the elastomer
$(^b)$ the monomer content is expressed as a weight percentage relative to the weight of the polybutadiene part 3.1.2—Results The processability of these elastomers is evaluated by measuring their Mooney viscosity according to the method described in paragraph 1.6 and the results are presented in table II. The Mooney viscosity is a parameter that is well known to those skilled in the art. It is generally accepted that the lower the Mooney viscosity of an elastomer, the more difficult it is to use this elastomer notably in mixtures. Moreover, a Mooney viscosity of an elastomer of greater than 100 MU is also not sought by rubber composition manufacturers.

TABLE II

|  | Elastomer A (outside the invention) | Resin-extended elastomer B (outside the invention) | Elastomer C (outside the invention) | Resin-extended elastomer D (in accordance with the invention) |
|---|---|---|---|---|
| Mooney viscosity (MU) | 40 | 23 | >100 | 71 |

1 MU = 0.83 N.m.

Elastomer A (outside the invention) is representative of an elastomer conventionally used in rubber compositions notably for tyre manufacture. It has a Mooney viscosity of 40 MU representative of a good processability of the elastomer since it is sparingly tacky.

When a plasticizing resin is mixed with this elastomer A to form the resin-extended elastomer B (resin-extended elastomer outside the invention), a decrease in the Mooney viscosity to 23 MU is observed. This lowering of the viscosity is incompatible with use of this compound in a rubber composition. This compound is difficult to process since it is very tacky.

When the number-average molar mass of elastomer A is increased to obtain elastomer C (elastomer outside the invention), an increase in its viscosity is also observed, which supposes great difficulty of processability of this elastomer.

Surprisingly, when a plasticizing resin is mixed with elastomer C, the resin-extended elastomer D is obtained (resin-extended elastomer in accordance with the invention) which has a Mooney viscosity equal to 70 MU. The Mooney viscosity of the resin-extended elastomer D is greater than that of elastomer A and supposes good processability.

3.2—Test 2:

The aim of this test is to show the improved processability properties of a composition according to the invention (C1) comprising a resin-extended elastomer in accordance with the invention relative to a control composition (T1) comprising an elastomer of the same microstructure but which is not resin-extended.

3.2.1—Formulation of the Compositions:

The formulations of compositions T1 and C1 are given in Table III. The contents of the various constituents are expressed in phr. The results of the tack properties measured on the raw (i.e. non-vulcanized) compositions are presented in table IV.

Composition C1 according to the invention differs from composition T1 in the nature of the elastomer: it comprises a resin-extended elastomer. Compositions C1 and T1 have the same total content of plasticizing resin (76 phr).

TABLE III

| Composition | T1 | C1 |
|---|---|---|
| Elastomer A (1) | 100 | (—) |
| Elastomer D (2) | (—) | 150 |
| Carbon black (3) | 7 | 7 |
| Silica (4) | 145 | 145 |
| Coupling agent (5) | 10.9 | 10.9 |
| TDAE oil (6) | 44 | 44 |
| Plasticizing resin (7) | 2 | 2 |
| Plasticizing resin (8) | 74 | 24 |
| Anti-ozonant wax | 1.5 | 1.5 |
| Antioxidant (9) | 2 | 2 |
| Accelerator (10) | 2.7 | 2.7 |
| DPG (11) | 2.2 | 2.2 |
| Sulfur | 1.8 | 1.8 |
| Stearic acid | 2 | 2 |
| Zinc oxide | 3 | 3 |

For this test, it was not possible to use elastomer C in a rubber composition since its Mooney viscosity is too high. It is consequently processed with difficulty.
(1) Elastomer A obtained according to the process described in paragraph 3.1.1. a) and the characteristics of which are reported in table I;
(2) Elastomer D obtained according to the process described in paragraph 3.1.1. d) and the characteristics of which are reported in table I;
(3) N234 grade carbon black sold by Cabot Corporation;
(4) Silica: Zeosil ® 1115MP silica sold by Solvay;
(5) Coupling agent: Bis[3-(triethoxysilyl)propyl] tetrasulfide silane (TESPT) sold by Evonik under the reference Si69;
(6) TDAE oil: TDAE oil sold by the company Klaus Dahleke under the reference 3VIVATEC500;
(7) Plasticizing resin: resin sold by ExxonMobil under the reference Escorez 1102;
(8) Plasticizing resin: resin sold by ExxonMobil under the reference Escorez 2173;
(9) Antioxidant: N-(1,3-dimethylbutyl)-N-phenyl-para-phenylenediamine sold by Flexsys under the reference Santoflex 6-PPD;
(10) Accelerator: N-cyclohexyl-2-benzothiazolesulfenamide sold by Flexsys under the reference Santocure CBS;
(11) DPG: diphenylguanidine sold by Flexsys under the reference Perkacit.

3.2.2—Production of the Compositions:

The compositions are prepared according to the following protocol:

The resin-extended or unextended elastomers, the reinforcing filler (silica), the carbon black, the coupling agent and then, after kneading for one to two minutes, the various other ingredients, with the exception of the vulcanization system, are introduced into an internal mixer which is 70% filled and which has an initial vessel temperature of about 50° C. Thermomechanical working (non-productive phase) is then performed in one step (total kneading time equal to about 5 min), until a maximum "dropping" temperature of about 165° C. is reached.

The mixture thus obtained is recovered and cooled and the vulcanization system (sulfur and accelerator) is then added on an external mixer (homofinisher) at 70° C., the whole being mixed (productive phase) for about 5 to 6 min.

The compositions thus obtained are subsequently calendered in the form of slabs (thickness of 2 to 3 mm) for measurement of their physical or mechanical properties before curing.

3.2.3—Results:

The tack properties of compositions T1 and C1 are measured according to the method described in paragraph 1.7 and presented in table IV below.

TABLE IV

| | Composition T1 | Composition C1 |
|---|---|---|
| Tack | 100 | 36 |

Table IV shows that composition C1 comprising a resin-extended elastomer in accordance with the present invention has tack properties that are markedly lower than those of composition T1 representative of a rubber composition intended for tyre manufacture. This result is all the more surprising since compositions C1 and T1 have the same total content of plasticizing resin, namely 76 phr.

The invention claimed is:

1. A resin-extended elastomer, the elastomer of which is a synthetic diene elastomer obtained by solution polymerization with a number-average molar mass of greater than or equal to 200,000 g/mol and the resin of which is a plasticizing hydrocarbon-based resin having a number-average molar mass of between 400 and 2000 g/mol, wherein the synthetic diene elastomer has a 1,2-vinyl butadiene monomer content of 5% to 30% by weight relative to a total weight of a polybutadiene part of the synthetic diene elastomer.

2. The resin-extended elastomer according to claim 1, wherein the number-average molar mass of the synthetic diene elastomer is in a range extending from 250,000 g/mol to 450,000 g/mol.

3. The resin-extended elastomer according to claim 1, wherein the plasticizing hydrocarbon-based resin is selected from the group consisting of aliphatic resins, aromatic resins and mixtures thereof.

4. The resin-extended elastomer according to claim 3, wherein the plasticizing hydrocarbon-based resin is selected from the group consisting of cyclopentadiene homopolymer or copolymer resins, dicyclopentadiene homopolymer or copolymer resins, terpene homopolymer or copolymer resins, C5 fraction homopolymer or copolymer resins, C9 fraction homopolymer or copolymer resins, mixtures of C5 fraction homopolymer or copolymer resins and of C9 fraction homopolymer or copolymer resins, α-methylstyrene homopolymer or copolymer resins, and mixtures thereof.

5. The resin-extended elastomer according to claim 1, wherein the content of plasticizing hydrocarbon-based resin is in a range extending from 5 to 100 phr.

6. The resin-extended elastomer according to claim 1 obtained by mixing the synthetic diene elastomer in solution in an organic solvent and the plasticizing hydrocarbon-based resin in the liquid state.

7. A composition based on at least one resin-extended elastomer according to claim 1 and on at least one reinforcing filler and further comprising at least one chemical crosslinking system.

8. A semi-finished product for a tire comprising at least one resin-extended elastomer according to claim 1.

9. A semi-finished product for a tire comprising at least one composition according to claim 7.

10. A tire comprising at least one resin-extended elastomer according to claim 1.

11. A tire comprising at least one composition according to claim 7.

12. A process for obtaining a resin-extended elastomer, the process comprising at least (a) one step of placing at least one synthetic diene elastomer in solution in an organic solvent in contact with at least one plasticizing hydrocarbon-based resin, the synthetic diene elastomer having a number-average molar mass of greater than or equal to 200,000 g/mol and a 1,2-vinyl butadiene monomer content of 5% to 30% by weight relative to the total weight of a polybutadiene part of the synthetic diene elastomer, and the plasticizing hydrocarbon-based resin having a number-average molar mass of between 400 and 2000 g/mol;
- (b) one mixing step of mixing to obtain a homogenous solution of synthetic diene elastomer and of plasticizing hydrocarbon-based resin;
- (c) one steam stripping step of steam stripping to recover a gaseous fraction enriched in organic solvent and an aqueous dispersion of particles of synthetic diene elastomer and of plasticizing hydrocarbon-based resin; and
- (d) one step of recovering the resin-extended elastomer form the aqueous dispersion of particles of synthetic diene elastomer and of plasticizing hydrocarbon-based resin.

13. The process for obtaining a resin-extended elastomer according to claim 12, wherein the synthetic diene elastomer of step (a) is obtained either by dissolution of the synthetic diene elastomer in the organic solvent or by solution polymerization in the organic solvent of corresponding monomers of the synthetic diene elastomer.

14. The process for obtaining a resin-extended elastomer according to claim 12, wherein, during the placing in contact in step (a), the plasticizing hydrocarbon-based resin is in the liquid state.

15. The process for obtaining a resin-extended elastomer according to claim 12, wherein the number-average molar mass of the synthetic diene elastomer is a less than or equal to 500,000 g/mol.

16. The process for obtaining a resin-extended elastomer according to claim 12, wherein the synthetic diene elastomer has a glass transition temperature of less than or equal to −60° C.

\* \* \* \* \*